US011137037B2

(12) United States Patent
Langenstein et al.

(10) Patent No.: US 11,137,037 B2
(45) Date of Patent: Oct. 5, 2021

(54) FLUID FRICTION CLUTCH

(71) Applicant: Mahle International GmbH, Stuttgart (DE)

(72) Inventors: Jens Langenstein, Vaihingen/Enz (DE); Gerold Schultheiss, Pforzheim (DE)

(73) Assignee: Mahle International GmbH

( * ) Notice: Subject to any disclaimer, the term of this patent is extended or adjusted under 35 U.S.C. 154(b) by 19 days.

(21) Appl. No.: 16/812,259

(22) Filed: Mar. 6, 2020

(65) Prior Publication Data

US 2020/0284306 A1 Sep. 10, 2020

(30) Foreign Application Priority Data

Mar. 7, 2019 (DE) ...................... 10 2019 105 869.4

(51) Int. Cl.
*F16D 35/02* (2006.01)
(52) U.S. Cl.
CPC ................................. *F16D 35/024* (2013.01)
(58) Field of Classification Search
CPC .................................................... F16D 35/024
See application file for complete search history.

(56) References Cited

U.S. PATENT DOCUMENTS

| 3,263,783 A | 8/1966 | Sutaruk |
| 3,419,122 A | 12/1968 | Connelly |
| 4,046,239 A * | 9/1977 | Tinholt ................. F16D 35/021 192/58.5 |
| 4,403,684 A * | 9/1983 | Haeck ................... F16D 35/022 192/58.681 |
| 4,403,757 A | 9/1983 | Shepherd |
| 4,564,093 A | 1/1986 | Storz |
| 5,119,921 A * | 6/1992 | Drennen ............... F16D 35/023 192/58.682 |
| 7,886,886 B2 | 2/2011 | Schultheiss et al. |

(Continued)

FOREIGN PATENT DOCUMENTS

| CN | 101463751 A | 6/2009 |
| CN | 103339399 A | 10/2013 |

(Continued)

OTHER PUBLICATIONS

English abstract for JP-H06 2717.
Chinese Office Action dated Jul. 5, 2021 for copending Chinese Application No. 202010153453.3 (with English translation).

*Primary Examiner* — David R Morris
(74) *Attorney, Agent, or Firm* — Fishman Stewart PLLC

(57) ABSTRACT

A fluid friction clutch may include a rotatably mounted shaft, a drive disk arranged on the shaft in a rotationally fixed manner, a driven body rotatably arranged on the shaft, and a ring-shaped transfer region disposed between the drive disk and the driven body. The transfer region may be configured to receive a viscous fluid via which the drive disk is couplable to the driven body for transferring a torque. The transfer region may be defined by a ring-shaped first groove profile of the drive disk and a ring-shaped second groove profile of the driven body that engage one another axially. The clutch may also include a storage chamber fluidically connected to the transfer region via an inflow path and via a return path. The return path may include a first retaining body and a second retaining body arranged radially offset relative to one another by an arc angle.

20 Claims, 15 Drawing Sheets

(56) References Cited

U.S. PATENT DOCUMENTS

| | | |
|---|---|---|
| 9,624,988 B2 | 4/2017 | Schmidt et al. |
| 9,709,103 B2 | 7/2017 | Krammer et al. |
| 2004/0168877 A1 | 9/2004 | Drager et al. |
| 2006/0278563 A1 | 12/2006 | Koga |
| 2010/0163362 A1 | 7/2010 | Sixt et al. |
| 2013/0313062 A1 | 11/2013 | Buchholz |
| 2014/0209180 A1* | 7/2014 | Boyer .................. F16D 35/024 137/15.01 |
| 2017/0335901 A1 | 11/2017 | Buchholz et al. |

FOREIGN PATENT DOCUMENTS

| | | |
|---|---|---|
| CN | 104454116 A | 3/2015 |
| CN | 104685252 A | 6/2015 |
| CN | 105190071 A | 12/2015 |
| DE | 14 50 113 A1 | 2/1969 |
| DE | 32 26 634 A1 | 1/1984 |
| DE | 10 2006 020 136 A1 | 10/2007 |
| DE | 10 2007 019 088 A1 | 10/2008 |
| DE | 10 2015 203 064 A1 | 8/2016 |
| EP | 1 391 624 A1 | 2/2004 |
| EP | 2 199 562 A2 | 6/2010 |
| EP | 3 176 456 A1 | 6/2017 |
| JP | H06 2717 A | 1/1994 |
| JP | H07293598 A | 11/1995 |
| JP | 2012107727 A | 6/2012 |

\* cited by examiner

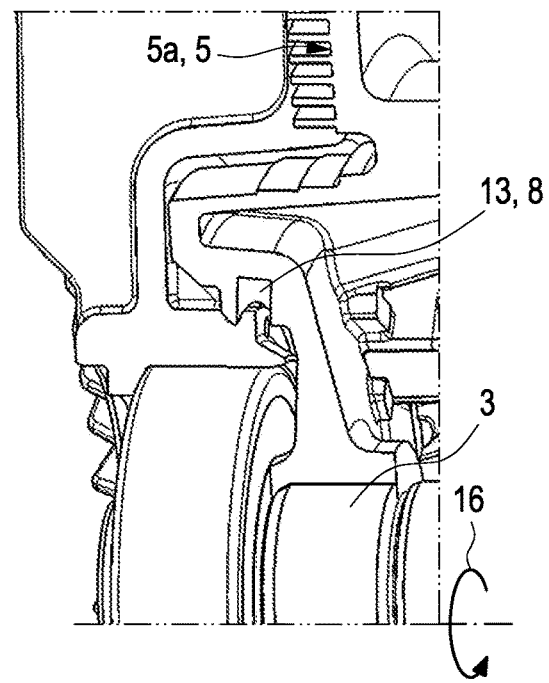
Fig. 8
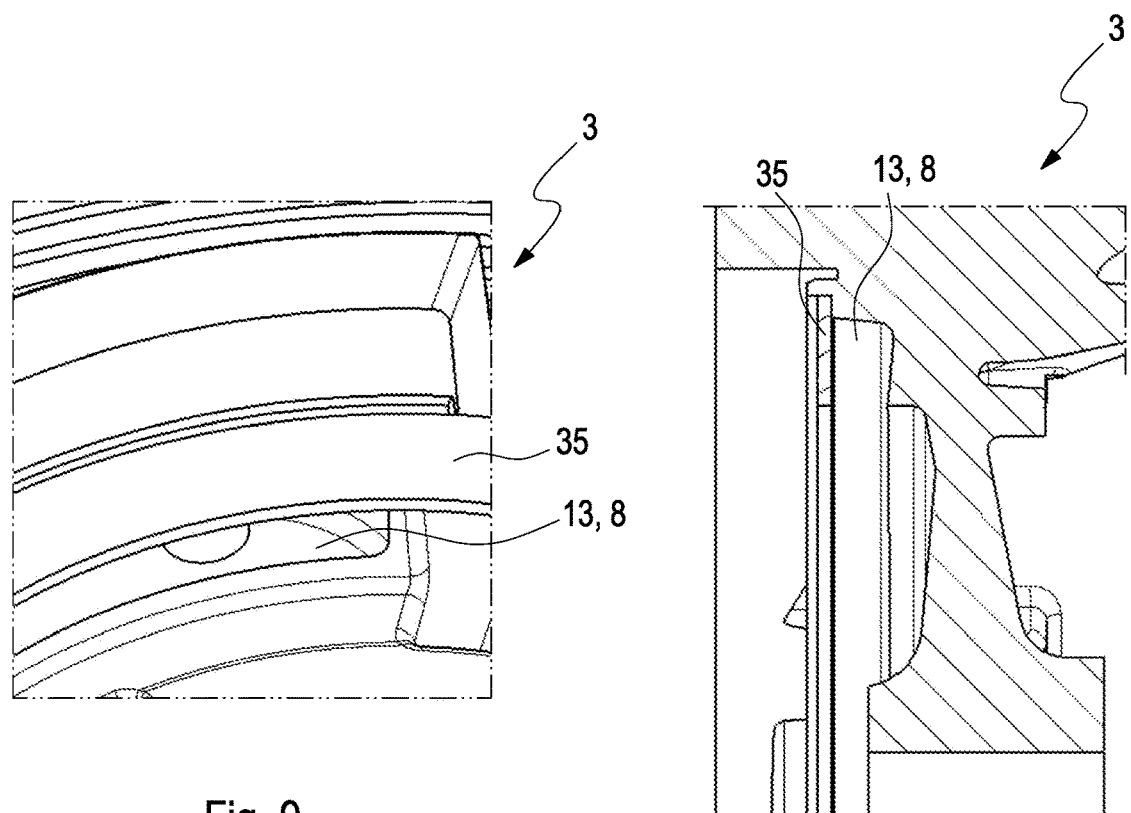
Fig. 9
Fig. 10

FLUID FRICTION CLUTCH

CROSS-REFERENCE TO RELATED APPLICATIONS

This application claims priority to German Patent Application No. DE 10 2019 105 869.4, filed on Mar. 7, 2019, the contents of which are hereby incorporated by reference in their entirety.

TECHNICAL FIELD

The invention relates to a fluid friction clutch, in particular for a motor vehicle fan.

BACKGROUND

A fluid friction clutch—also referred to as Visco clutch (Visco® is a registered trademark of MAHLE Behr GmbH & Co. KG, 70469, Stuttgart, Germany) usually comprises a shaft, a drive disk, and a driven body. The drive disk is secured to the shaft in a rotationally fixed manner and transfers the torque to the driven body, which is rotatably arranged on the shaft. To transfer the torque, the drive disk and the driven body are coupled to one another by means of a viscous fluid—mostly oil. The viscous fluid is thereby conveyed into a transfer region between the drive disk and the driven body, so that the drive disk and the driven body are frictionally coupled via the viscous fluid. If the driven body is to be decoupled from the drive disk, the fluid is conveyed out of the transfer region into a storage chamber. The shaft is thereby mechanically driven by the internal combustion engine and is drive-connected, preferably directly, to the crankshaft. In the alternative, the shaft can be driven via a belt drive. The driven body can, for example, be a motor vehicle fan.

In the case of the further development of the motor vehicles, the fuel economy plays a crucial role. The slip speed of the driven body or of the motor vehicle fan, respectively, is therefore of great importance when the fluid friction clutch is turned off. This represents a particular challenge in particular in the case of applications with rotational speeds of the drive disk of over 4000 revolutions per minute and with smaller driven bodies or motor vehicle fans, respectively. Small residual amounts of the viscous fluid in the transfer region can already lead to a high slip speed of the driven body or of the motor vehicle fan, respectively, in the turned-off fluid friction clutch. In some rare cases, the drive disk can further also assume an unfavorable rotational angle position with the storage chamber when the internal combustion engine is turned off or when the fluid friction clutch is not driven, respectively, in the case of which a portion of the viscous fluid can reach out of the storage chamber into the transfer region due to the force of gravity. When starting the internal combustion engine, the fluid friction clutch is then already connected, and the driven body or the motor vehicle fan, respectively, is co-rotated undesirably for a short time.

Different solutions are known from the prior art, which, however, only partially meet the demands with regard to the slip speed and the connection behavior of the fluid friction clutch. EP 2 199 562 B1 describes for example a fluid friction clutch comprising a storage chamber, which is arranged in the driven body or on the secondary side, respectively. When the fluid friction clutch is turned off, a small amount of the viscous fluid remains in the transfer region here and the slip speed is reduced. When connecting the fluid friction clutch, however, a transfer of the viscous fluid into the transfer region is delayed, because only a small centrifugal force acts on the viscous fluid in the storage chamber due to a rotational speed of the driven body, which is small for the time being. A low slip speed of the driven body is thus associated with a delay when connecting the fluid friction clutch here. If the storage chamber is arranged in the drive disk or on the primary side, respectively as described in DE 102 007 019 088 A1, the connecting of the fluid friction clutch can be accelerated significantly. It is a disadvantage, however, that a large amount of the viscous fluid also remains in the transfer region and the slip speed is high when the fluid friction clutch is turned off. A further solution is known from DE 10 2006 020 136 A1. Even though the storage chamber is arranged in the drive disk or on the primary side here, respectively, it is connected to the transfer region via a bore, which is arranged in the driven body or on the secondary side, respectively. The slip speed is reduced in that the viscous fluid is wiped off and pumped out in the transfer region by means of a retaining element. The retaining element, however, is rather less advantageous here with regard to the effort, the costs, and the durability. Further solutions are known, for example, from EP 3 176 456 A1; DE 32 26 634 A1; DE 1 450 113 A, and EP 1 391 624 A1.

All conventional solutions have in common that in particular in applications with rotational speeds of the drive disk of over 4000 revolutions per minute, an optimization with regard to the slip speed of the driven body leads to a deterioration of the connection behavior of the fluid friction clutch.

SUMMARY

It is thus the object of the invention to specify an improved or at least alternative embodiment for a fluid friction clutch of the generic type, in the case of which the described disadvantages are overcome. The connection and the turn-off of the fluid friction clutch is to in particular be accelerated and the actuating dynamic of the fluid friction clutch is to be improved. The slip speed of the driven body is to further be reduced.

This object is solved according to the invention by means of the subject matter of the independent claim(s). Advantageous embodiments are subject matter of the dependent claim(s).

A fluid friction clutch is provided in particular for a motor vehicle fan and has a rotatably mounted shaft, a drive disk, which is arranged on the shaft in a rotationally fixed manner, and a driven body, which is rotatably arranged on the shaft. A ring-shaped transfer region, which extends radially, for receiving a viscous fluid, via which the drive disk can be coupled to the driven body for transferring a torque, is formed between the drive disk and the driven body. The transfer region is thereby formed at least in some regions by a ring-shaped first groove profile of the drive disk, which extends radially, and a ring-shaped second groove profile of the driven body, which extends radially. The first groove profile and the second groove profile engage axially with one another. The fluid friction clutch further has a ring segment-shaped storage chamber for receiving the viscous fluid, which is fluidically connected to the transfer region via an inflow path and via a return path. According to the invention, the return path has a first retaining body and a second retaining body, which are arranged on the first or second groove profile so as to be offset radially relative to one another and by an arc angle, which deviates from zero, in the direction of rotation.

The inflow path fluidically connects the transfer region to the storage chamber, wherein the viscous fluid can be conveyed out of the storage chamber into the transfer region via the inflow path under the effect of the centrifugal force. The return path fluidically connects the storage chamber to the transfer region in the same way, wherein the viscous fluid can be conveyed out of the transfer region into the storage chamber, for example under the effect of the retaining pressure in the transfer region. It goes without saying that for generating the centrifugal force and the retaining pressure in the fluid friction clutch, the latter has to be driven by the internal combustion engine. The driven fluid friction clutch is completely turned off, when the viscous fluid is conveyed almost completely into the storage chamber. The driven body is decoupled from the drive disk in this case and the fluid friction clutch is in neutral. The driven fluid friction clutch is therefore connected completely, when the viscous fluid is conveyed almost completely into the transfer region. The transfer region can thereby be formed completely by the groove profiles. In the alternative, it can be provided that the transfer region outside of the two groove profiles is formed by means of a ring-shaped, planar first disk region on the drive disk, and by means of a ring-shaped planar second disk region on the driven body. The two disk regions are thereby displaced radially to the inside to the respective groove profiles and abut against one another as intended. In the transfer region, the viscous fluid wets the two groove profiles and, if available, also the two disk regions, so that the torque is transferred via the viscous fluid to the driven body in response to the rotation of the drive disk, and the driven body is co-rotated in the direction of rotation. The driven body is thus rotationally coupled to the drive disk in the connected fluid friction clutch. When the internal combustion engine is turned off, the fluid friction clutch is not driven and the drive disk as well as the driven body are at rest.

The first retaining body and the second retaining body are thereby arranged on the first groove profile of the drive disk on the primary side or on the second groove profile of the driven body on the secondary side. The retaining bodies thereby support the conveying of the viscous fluid out of the transfer region into the storage chamber. The first retaining body and the second retaining body are thereby arranged offset radially to one another and by an arc angle in the direction of rotation, and can be optimized independently of one another to different functional goals. The first retaining body can thus for example increase the retaining pressure in the viscous fluid within the transfer region, so that the viscous fluid can be conveyed effectively and quickly out of the transfer region into the storage chamber. When turning off the fluid friction clutch, the second retaining body can then remove the residual amount of the viscous fluid from the transfer region, so that the slip speed of the driven body is minimized. This advantageous effect of the two retaining bodies, which are independent of one another, is additionally independent of whether the retaining bodies are arranged on the primary side or on the secondary side. In a preferred embodiment of the fluid friction clutch, the two retaining bodies are arranged on the secondary side, however, because a smaller centrifugal force then acts on the viscous fluid, and the viscous fluid can be conveyed out of the transfer region via the return path into the storage chamber at a comparatively reduced counter-pressure.

In the case of an advantageous further development of the first retaining body, it is provided that the latter protrudes axially from the first or second groove profile and engages axially and radially on both sides with a depression of the second or first groove profile so as to form a seal. The viscous fluid can then be retained at the first retaining body between the first groove profile and the second groove profile. It is additionally provided that the first retaining body is arranged downstream in the return path of a return opening, which leads to the storage chamber. In other words, the return opening is displaced downstream from or displaced upstream of the first retaining body in the direction of rotation, depending on whether the retaining bodies are arranged on the primary side or on the secondary side. The drive disk and the driven body rotate in the direction of rotation at a rotational speed, which differs, wherein the rotational speed of the drive disk is always higher than the rotational speed of the driven body. If the retaining bodies are arranged on the primary side, the first retaining body wipes the viscous fluid off the driven body, which rotates more slowly, and pushes it forward in the direction of rotation. The return opening is then suitably displaced upstream of the first retaining body in the direction of rotation. If the retaining bodies are arranged on the secondary side, the first retaining body wipes the viscous fluid off the drive disk, which rotates more quickly, and the viscous fluid is retained downstream from the first retaining body in the direction of rotation. The return opening is then suitably displaced downstream from the first retaining body in the direction of rotation. The viscous fluid retained at the first retaining body can then advantageously be conveyed to the storage chamber via the return opening. The axially protruding first retaining body can in particular form a retaining surface, which preliminarily retains the viscous fluid. A retaining pressure, which forces the viscous fluid into the return opening, is thereby generated in the viscous fluid. Due to a three-sided seal on the first retaining body, the retaining pressure in the viscous fluid generated on the first retaining body is advantageously so high that a large amount of the viscous fluid can be conveyed out of the transfer region into the storage chamber even in the case of a high centrifugal force acting on the viscous fluid and thus also in the case of a high counter-pressure in the return path.

In the case of an advantageous further development of the second retaining body it is provided that the latter is offset radially to the outside to the first retaining body, and abuts thereon so as to form a radial or radial and axial seal in an edge region of the second or first groove profile. The excess viscous fluid can then be wiped radially or radially and axially off the second or first groove profile and can be retained at the second retaining body. If the second retaining body abuts radially on the respective groove profile in the edge region, the excess viscous fluid can be wiped off from an axially oriented circumferential edge surface of the respective groove profile. If the second retaining body also abuts axially on the respective groove profile in the edge region, the second retaining body can additionally also wipe the excess viscous fluid off a radially oriented edge surface of the respective groove profile.

In the case of this advantageous design of the retaining body, the viscous fluid can be conveyed almost completely into the storage chamber when turning off the fluid friction clutch, and the residual amount of the viscous fluid can thus be minimized in the transfer region when the fluid friction clutch is turned off. Compared to conventional solutions, the slip speed of the driven body can therefore also be minimized independently of the arrangement of the retaining bodies on the primary side or on the secondary side. Due to the fact that the two retaining bodies can be arranged on the primary side or on the secondary side, they cooperate with the first or second groove profile, depending on the arrangement thereof.

If the two retaining bodies are designed as described above, the second retaining body can be fluidically connected to the return opening, which leads to the storage chamber, on the first retaining body in the return path via a leakage path, which is formed on the first or second groove profile. The viscous fluid retained upstream of the second retaining body can then be conveyed via the leakage path to the first retaining body, and further via the return opening on the first retaining body to the storage chamber. In the alternative, the second retaining body can be arranged downstream in the return path of a further return opening, so that the viscous fluid retained upstream of the second retaining body can be conveyed to the storage chamber via the further return opening. Regardless of the type of the fluidic connection between the second retaining body and the storage chamber, the second retaining body can be optimized independently of the first retaining body.

It can advantageously be provided that the second retaining body is arranged in a normal pressure region of the first retaining body. The effect of the first retaining body on the viscous fluid is thereby approximately eliminated in the normal pressure region. A counteracting of the retaining pressure at the first retaining body to the retaining pressure at the second retaining body and a flow-back of the viscous fluid from the first retaining body to the second retaining body, which is generated thereby, can be prevented in this way in an advantageous manner. This arrangement of the retaining bodies also offers a large design freedom for the two retaining bodies and simultaneously a production-related simplification of the fluid friction clutch. The two retaining bodies, which are arranged on the secondary side, can thus be offset relative to one another in the direction of rotation, for example by the arc angle of equal to approximately 180° or can follow one another closely. The first retaining body is thereby displaced downstream from the second retaining body in the direction of rotation. The two retaining bodies on the primary side can follow one another tightly, for example. The first retaining body is thereby suitably displaced upstream of the second retaining body in the direction of rotation. In the alternative, the second retaining body can be arranged in a positive pressure region of the first retaining body. In the alternative, the second retaining body can be arranged in a transition region between a normal pressure region and a positive pressure region of the first retaining body. The effect of the first retaining body on the viscous fluid is thereby not eliminated in the positive pressure region. The second retaining body can then advantageously support the draining of the viscous fluid via the return opening.

It can advantageously be provided that the first retaining body has several steps, each comprising a different axial height, wherein the smaller steps are arranged upstream of the larger steps in the direction of rotation, and the return opening leads into the transfer region at one of the steps. The first retaining body preferably has two steps, and the return opening leads to the step with the smaller axial height. The respective step thereby forms a retaining surface for the viscous fluid, at which the latter can be retained. Due to the stepped design of the first retaining body, a strong retaining pressure can be generated on the first retaining body, without the latter already being throttled upstream of the return opening. The smaller step can be displaced upstream of or downstream from the larger step in the direction of rotation, depending on whether the retaining bodies are arranged on the primary side or on the secondary side. If the retaining bodies are arranged on the primary side, the smaller step is displaced upstream of the larger step in the direction of rotation. If the retaining bodies are arranged on the secondary side, the smaller step is thus displaced downstream from the larger step.

In the case of an advantageous further development of the fluid friction clutch it is provided that in addition to the retaining bodies, the return path has at least one return opening, which leads radially to the inside at least in some regions, and at least one axial duct bore. The respective return opening thereby leads into the transfer region on the one hand and is fluidically connected to the at least one duct bore on the other hand. The at least one duct bore then leads to the storage chamber, so that the viscous fluid retained at the retaining bodies can be conveyed to the storage chamber via the respective return opening under the effect of the retaining pressure at the retaining bodies and via the at least one duct bore.

To support the flow-off of the viscous fluid via the at least one duct bore, the latter can be directed axially to the outside. In other words, the at least one duct bore is directed obliquely to the outside and thus has an angle to the longitudinal central axis of the shaft, which deviates from zero and from 90°. The centrifugal force thus acts on the fluid in the at least one duct bore, and the viscous fluid can be conveyed almost completely out of the return path to the storage chamber under the effect of the centrifugal force. When the fluid friction clutch is turned off, the residual amount of the viscous fluid in the return path and the slip speed of the driven body can thus be reduced. The residual amount of the viscous fluid, which flows back, can thus further also be reduced in the case of an unfavorable rotational position of the non-driven fluid friction clutch, and an unwanted connection of the fluid friction clutch can be prevented when starting the internal combustion engine.

In the case of an advantageous further development of the fluid friction clutch it is provided that the inflow path comprises an axial inflow opening and at least one circumferential ring segment-shaped siphon duct. The at least one siphon duct thereby fluidically connects the storage chamber to the inflow opening, and the inflow opening leads into the at least one siphon duct on the one hand and into the transfer region on the other hand. The viscous fluid can then be conveyed out of the storage chamber to the inflow opening via the at least one siphon duct under the effect of the centrifugal force, and via the inflow opening into the transfer region under the effect of the centrifugal force, and can be distributed in the latter.

Additionally, it can advantageously be provided that the at least one duct bore of the return path fluidically connects adjacent to the inflow opening via a short-circuit duct of the return path, which is directed to the outside, into the at least one siphon duct. The viscous fluid can then flow out of the at least one duct bore of the return path via the at least one short-circuit duct directly into the inflow opening of the inflow path. The storage chamber can thus be bypassed. This advantageous designed provides for a quick connection of the fluid friction clutch, because the viscous fluid bypasses the storage chamber via the short-circuit duct when connecting the fluid friction clutch. The viscous fluid thus flows out of the storage chamber and out of the return path into the transfer region, so that the storage chamber can be emptied almost completely, and the viscous fluid can be conveyed almost completely into the transfer region. The short-circuit duct is thereby directed radially to the outside, whereby the at least one duct bore leads into the short-circuit duct offset radially to the inside relative to the inflow opening. The viscous fluid can thus flow from the at least one duct bore to the inflow bore via the short-circuit duct under the effect of the centrifugal force.

In the case of a further development of the siphon duct, the latter can have an inflow, which fluidically connects to the storage chamber, and an outflow, which fluidically connects to the inflow opening. The outflow is thereby offset radially to the outside relative to the inflow, so that the viscous fluid can be conveyed out of the storage chamber via the at least one siphon duct to the inflow opening under the effect of the centrifugal force. The inflow is furthermore offset by more than 90° to the outflow in or opposite to the direction of rotation, so that the viscous fluid cannot flow unhindered into the transfer region even in the case of an unfavorable rotational position of the non-driven fluid friction clutch. In the case of the non-driven fluid friction clutch, the viscous fluid can then in particular flow either into the inflow of the siphon duct or into the inflow opening under the effect of the gravitation. If the inflow of the siphon duct is on the bottom, the viscous fluid can flow into the inflow, but does not reach to the offset inflow opening. If the inflow opening is on the bottom, a small residual amount of the viscous fluid can reach out of the siphon duct into the inflow opening, but no fluid can flow out of the storage chamber into the siphon duct. An unwanted connection of the driven body when starting the internal combustion engine can thus be prevented effectively. In addition, the storage chamber can be eccentric and/or at least one axial wall of the storage chamber can be directed axially to the outside towards or away from the shaft at least in some regions, so that the viscous fluid can be conveyed to the inflow of the at least one siphon duct under the effect of the centrifugal force.

The fluid friction clutch can generally be designed differently. The retaining bodies of the return path and the at least one return opening of the return path can thus be formed in the driven body and the storage chamber, the at least one duct bore of the return path, the inflow opening of the inflow path, and the at least one siphon duct of the return path can be formed in the drive disk. The retaining bodies and the at least one return opening are thus arranged on the secondary side, and the storage chamber is arranged on the primary side. The at least one return opening is thereby fluidically connected to the at least one duct bore via a circumferential eccentric collecting groove, which is formed in the drive disk. The collecting groove is thereby eccentric, so that the viscous fluid in the collecting groove is conveyed into a region with a larger radius due to the acting centrifugal force. The at least one duct bore leads into the collecting groove in this region as intended, so that the viscous fluid can be conveyed almost completely out of the collecting groove under the effect of the centrifugal force. In the alternative, the retaining bodies of the return path and the at least one return opening of the return path, the storage chamber, the at least one duct bore of the return path, the inflow opening of the inflow path, and the at least one siphon duct of the inflow path can be formed in the drive disk. The retaining bodies and the at least one return opening as well as the storage chamber are then arranged on the primary side. The at least one return opening then leads directly into the at least one duct bore. Regardless of the arrangement of the elements in the fluid friction clutch, the transfer region can advantageously be emptied almost completely with the help of the two retaining bodies, and the slip speed of the driven body can be reduced when the fluid friction clutch is in neutral.

In the case of an advantageous further development of the fluid friction clutch it is provided that the fluid friction clutch has a magnetic valve for opening and for closing the inflow path. The magnetic valve thereby has an electrical coil revolving around the shaft, a ferromagnetic armature disk revolving around the shaft, and at least one return spring. The armature disk is thereby arranged in an axially movable and pivotable manner under the effect of the magnetic force of the coil and has a valve molding. The effect of the magnetic force of the coil is thereby directed against the effect of the spring force of the return spring as intended. When the inflow path is closed, the electrical coil is connected and the armature disk is axially moved or pivoted under the effect of the magnetic force. The valve molding abuts on the inflow path—and in particular on the inflow opening of the inflow path. The inflow path is closed and the viscous fluid cannot flow into the transfer region. When the inflow path is open, the electrical coil is turned off and the armature disk is axially moved or pivoted away. The valve molding of the armature disk is spaced apart from the inflow path—and in particular from the inflow opening of the inflow path—and the inflow path is open. The inflow path can thus be closed when turning off the fluid friction clutch, and can be open when connecting the fluid friction clutch.

In the case of an identically designed magnetic valve, the electrical coil can alternatively be turned off and the armature disk can be axially moved or pivoted under the effect of the spring force of the return spring when the inflow path is closed. The valve molding then abuts on the inflow path and closes the latter. When the inflow path is open, the electrical coil is then connected and the armature disk is axially moved or pivoted away under the effect of the magnetic force of the coil and against the effect of the spring force of the return spring, so that the valve molding releases the inflow path. When turning off the fluid friction clutch, the inflow path can thus be open, and can be closed when connecting the fluid friction clutch.

The fluid friction clutch can advantageously have a cover and a closing disk. The closing disk can thereby be arranged on the drive disk axially adjacent thereto and can be secured so as to be tight radially to the outside. The cover can be arranged on the closing disk axially adjacent thereto and can be secured to the driven body. The closing disk and the drive disk are then arranged axially between the driven body and the cover. The cover can, for example, be a sheet metal part and can have a reinforcing rib and a support region. The reinforcing rib as well as the support region are formed circumferentially, wherein the support region connects to the reinforcing rib radially on the outside. The cover is thereby fastened to the driven body in a rotationally fixed manner and is preferably crimped into the driven body. The support region is then located in a support depression of the driven body and engages radially and axially with the driven body within said support depression. If the fluid friction clutch has the magnetic valve as described above, the closing disk and/or the cover can be ferromagnetic for example of steel and can form an external pole of the electrical coil of the magnetic valve. An external coil cup for guiding the magnetic field of the coil can further be provided. The magnetic flux of the external pole then takes place via the external coil cup, the cover, and the closing disk. An internal sleeve in the electrical coil can then form an internal pole of the electrical coil. The magnetic flux of the internal pole then takes place via the external coil cup, the shaft, and the internal sleeve.

The armature disk is then mounted so as to be pivotable or axially movable to the internal pole and to the external pole. Due to large radial overlapping of the individual elements, the magnetic flux can be increased and optimized in an advantageous manner. A higher magnetic force can thus be exerted on the armature disk and the latter can be axially moved or pivoted quickly and effectively to the external pole and to the internal pole even in the case of a smaller electrical coil. In the alternative, the cover can be a cast part, which is secured to the driven body in a rotationally fixed manner.

To determine the rotational speed of the driven body, the fluid friction clutch can have a rotational speed counter comprising a Hall sensor and comprising a rotational speed cam. The Hall sensor comprising an integrated or separate permanent magnet can thereby be fastened in a rotationally fixed housing section of the fluid friction clutch. The rotational speed cam can then be formed in the cover—which is a sheet metal part, for example. The cover is firmly connected to the driven body, so that a rotational speed of the driven body can be determined on the cover. The rotational speed cam is oriented to the Hall sensor as intended in such a way that it can determine a change of the magnetic field and thus the rotational speed of the cover and therefore of the driven body. In the alternative, the fluid friction clutch can have a rotational speed counter comprising a Hall sensor and comprising a rotational speed cam. The Hall sensor comprising an integrated or separate permanent magnet is then formed in a rotationally fixed housing section of the fluid friction clutch, and the rotational speed cam is formed on a tooth bezel, which is secured to the cover. When rotating the driven body and the cover, the tooth bezel can influence the magnetic field of the permanent magnet as a function of the rotational speed, so that the rotational speed counter can determine the rotational speed of the driven body. This design is conceivable in the case of the cover, which is designed as a sheet metal part as well as a cast part. The tooth bezel or the cover, respectively, is made of a material, which is suitable for influencing the magnetic field, as intended.

In summary, the slip speed of the driven body in neutral can be reduced significantly in the fluid friction clutch according to the invention, without negatively influencing the connection of the fluid friction clutch. The viscous fluid can further be conveyed more quickly into the transfer region of out of the transfer region, so that the connection—for example when cold starting the internal combustion engine—and the turn-off of the fluid friction clutch are accelerated, and the actuating dynamic of the fluid friction clutch is improved.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically,

FIGS. 8 and 10 show sectional views of the drive disk on a collecting groove in the fluid friction clutch in the first embodiment;

FIG. 9 shows a view of the collecting groove in the fluid friction clutch in the first embodiment;

DETAILED DESCRIPTION

Figure 1:
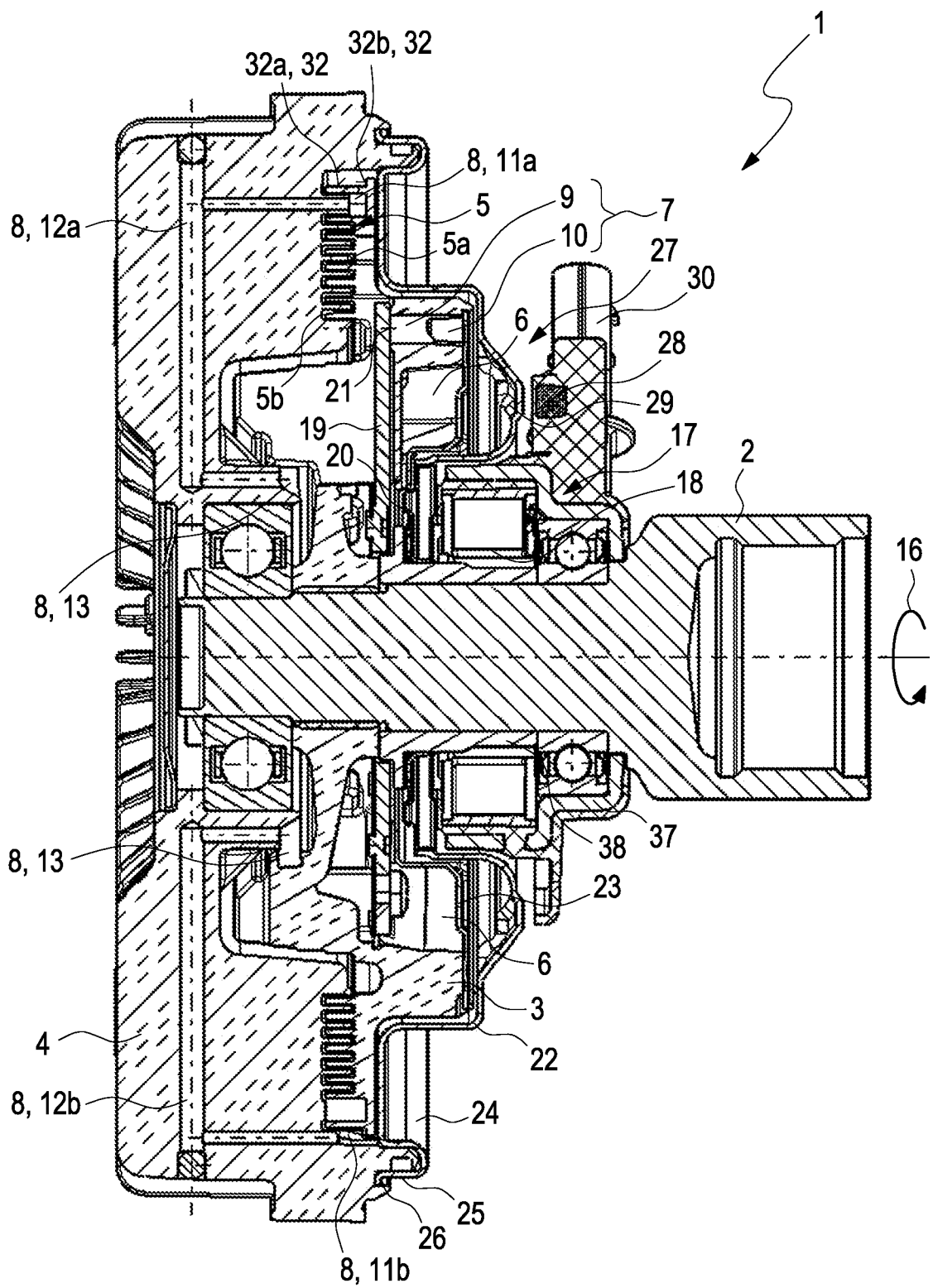
FIG. 1 shows a sectional view of a fluid friction clutch according to the invention in a first embodiment.

FIG. 1 shows a sectional view of a fluid friction clutch 1 according to the invention in a first embodiment. The fluid friction clutch 1 has a rotatable shaft 2, a drive disk 3, which is arranged on the shaft 2 in a rotationally fixed manner, and a driven body 4—here a motor vehicle fan—which is rotatably arranged on the shaft 2. A ring-shaped transfer region 5, which extends radially, for receiving a viscous fluid is formed between the drive disk 3 and the driven body 4. The transfer region 5 is thereby formed by means of a first groove profile 5a of the drive disk 3 and a second groove profile 5b of the driven body 4. The two groove profiles 5a and 5b are ring-shaped and extend radially to the shaft 2. The groove profiles 5a and 5b have several depressions and elevations and engage axially with one another. The fluid friction clutch 1 further has a ring segment-shaped storage chamber 6 for receiving the viscous fluid, which is formed in the drive disk 3 on the primary side. The storage chamber 6 is fluidically connected to the transfer region 5 via an inflow path 7 and via a return path 8.

The inflow path 7 thereby comprises an axial inflow opening 9 and two circumferential ring segment-shaped siphon ducts 10, which are formed—here cast—in the drive disk 3 on the primary side. The siphon ducts 10 thereby fluidically connect the storage chamber 6 to the inflow opening 9, and the inflow opening 9 leads into the siphon ducts 10 on the one hand and into the transfer region 5 on the other hand. In the connected fluid friction clutch 1, the viscous fluid flows out of the storage chamber 6 via the siphon ducts 10 to the inflow opening 9 and via the latter into the transfer region 5 under the effect of the centrifugal force. The design of the inflow path 7 and in particular of the siphon ducts 10 will be described in more detail below by means of FIG. 7.

The return path 8 comprises a first retaining body 11a and a second retaining body 11b, two return openings 12a and 12b, which lead radially to the inside in some regions, for the respective retaining body 11a and 11b, and a circumferential eccentric collecting groove 13. The collecting groove 13 is fluidically connected to the inflow path 7 in the return path 8 via two axial duct bores 14 and two short-circuit ducts 15—they can be seen in FIG. 7. In the first embodiment, the two retaining bodies 11a and 11b are formed in the fluid friction clutch 1 in the driven body 4 on the secondary side and are arranged radially offset to one another. The two retaining bodies 11a and 11b are further offset to one another by an arc angle of equal to 180° in the direction of rotation 16. The two retaining bodies 11a and 11b are thus independent of one another and can therefore be optimized independently of one another. The two return openings 12a and 12b are also formed in the driven body 4 on the secondary side. The collecting groove 13, the duct bores 14, and the short-circuit ducts 15 are molded in the drive disk 3 on the primary side. The return openings 12a and 12b thereby lead into the transfer region 5 on the one hand and into the collecting groove 13 on the other hand. The duct bores 14 then lead out of the collecting groove 13 via the short-circuit ducts 15 to the siphon ducts 10 of the inflow path 7. The viscous fluid retained at the retaining bodies 11a and 11b can then flow off into the collecting groove 13 via the return openings 12a and 12b and out of the collecting groove 13 via the duct bores 14 and the short-circuit ducts 15. At the collecting groove 13, the return path 8 transitions from the driven body 4 on the secondary side to the drive disk 3 on the primary side. The design of the duct bores 14 and of the short-circuit ducts 15 will be described in more detail below by means of FIG. 5 to FIG. 7. The design of the collecting groove 13 is shown in FIG. 8 to FIG. 10. The design of the two retaining bodies 11a and 11b will be described in more detail below by means of FIG. 2 to FIG. 4.

If the shaft 2 and thus the fluid friction clutch 1 is driven, the drive disk 3 rotates in the direction of rotation 16 at the rotational speed of the shaft 2. If the fluid friction clutch 1 is connected, the viscous fluid is almost completely in the transfer region 5. In the transfer region 5, the viscous fluid wets the two groove profiles 5a and 5b, so that the drive disk 3 transfers the torque to the driven body 4 via the viscous fluid and said driven body co-rotates in the direction of rotation 16. If the fluid friction clutch 1 is turned off, the viscous fluid is conveyed almost completely into the storage chamber 6. The groove profiles 5a and 5b do not have a frictional contact with one another, and the driven body 4 is uncoupled from the drive disk 3.

Figure 13:
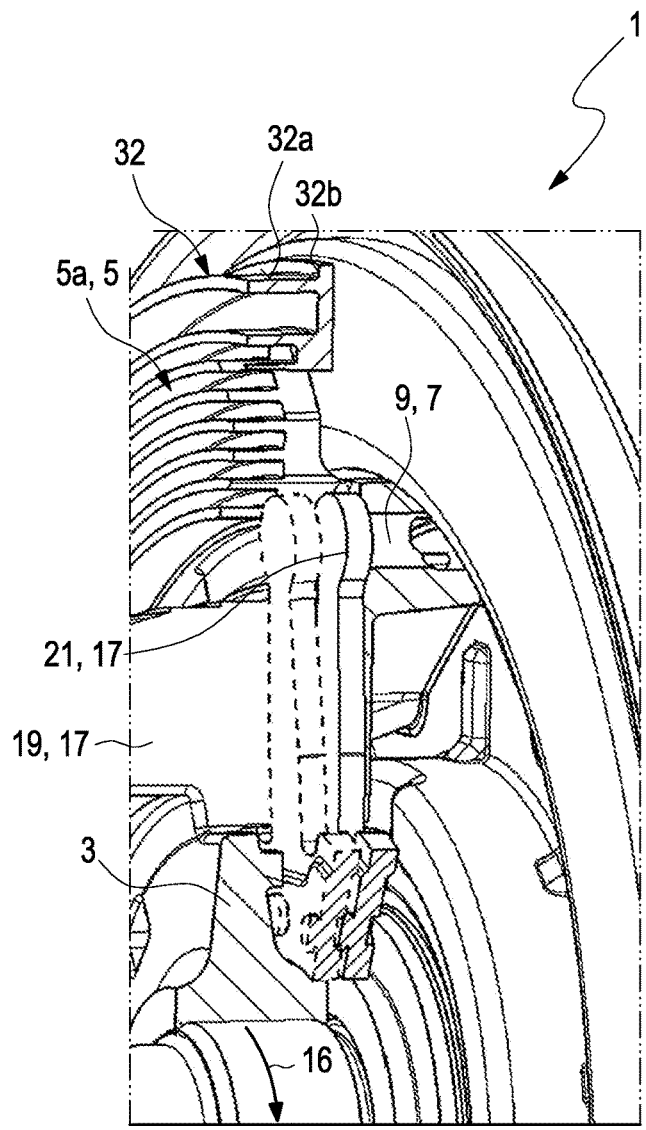
FIG. 13 shows a view of the magnetic valve in the fluid friction clutch in the first embodiment.

When turning off the fluid friction clutch 1, the viscous fluid flows out of the transfer region 5 into the storage chamber 6. To prevent the simultaneous inflow of the fluid through the inflow path 7 into the transfer region 5, the fluid friction clutch 1 has a magnetic valve 17. The magnetic valve 17 is thereby formed to open and to close the inflow opening 9 and comprises an electrical coil 18, a ferromagnetic armature disk 19, and a return spring 20. The armature disk 19 can thereby be pivoted under the effect of the magnetic force of the coil 18 and has a valve molding 21 for closing the inflow opening 9. When the inflow path 7 is closed as shown here the electrical coil 18 is connected and the armature disk 19 is pivoted. The valve molding 21 abuts on the inflow opening 9 so as to form a seal and closes it, so that the viscous fluid cannot flow into the transfer region 5. When the inflow path 7 is open, the electrical coil 18 is turned off and the armature disk 19 is pivoted away from the inflow opening 9 by means of the return spring 20. The valve molding 21 does not abut on the inflow opening 9 and the viscous fluid can flow into the transfer region 5 via the inflow opening 9. The magnetic valve 17 is shown in FIG. 13 in an enlarged manner. A reversal is generally also conceivable, in the case of which the inflow path 7 is open after connecting the electrical coil 18, and the inflow path is closed after the electrical coil 18 is turned off. An external coil cup 37 is arranged around the coil 18, and an inner sleeve 38 is arranged around the aft 2 inside the coil 18, which are provided for guiding the magnetic field of the coil 18. A higher magnetic force can thus be exerted on the armature disk 19 and the latter can be axially moved or pivoted quickly and effectively even in the case of a smaller electrical coil 18.

The fluid friction clutch 1 further has a cover 22 and a closing disk 23. The closing disk 23 is arranged on the drive disk 3 facing away from the driven body 4 and axially spaced apart from the drive disk 3, and axially closes the storage chamber 6. What applies thereby is that the deeper the storage chamber 6 and the smaller the inner diameter of the closing disk 23, the larger the amount of the fluid, which can be retained in the storage chamber 6. The cover 22 is secured to the driven body 4 in a radially circumferential manner, so that the drive disk 3 and the closing disk 23 are encased axially and radially by the driven body 4 and the cover 22. The cover 22—here a sheet metal part made of steel—has a reinforcing rib 24 and a support region 25, which connects to said reinforcing rib radially on the outside. The support region 25 is thereby arranged in a support depression 26 of the driven body 4—here made of aluminum—and radially and axially engages with the driven body 4 inside said support depression. The cover 22 is preferably crimped into the driven body 4. The design of the cover 22 shown here is shown in an enlarged manner in FIG. 14. To determine the rotational speed of the driven body 4, the fluid friction clutch 1 further has a rotational speed counter 27 comprising a Hall sensor 28 and comprising a rotational speed cam 29. The Hall sensor 28 comprising an integrated or separate permanent magnet is thereby fastened in a rotationally fixed housing section 30 of the fluid friction clutch 1 and the rotational speed cam 29 is formed in the cover 22. The rotational speed cam 29—as well as the cover 22—is thus made of steel and can influence the magnetic field and thus the Hall sensor 28. The housing section 30 is secured to the coil cup 37 here or is formed integrally thereon, respectively.

Figure 2:
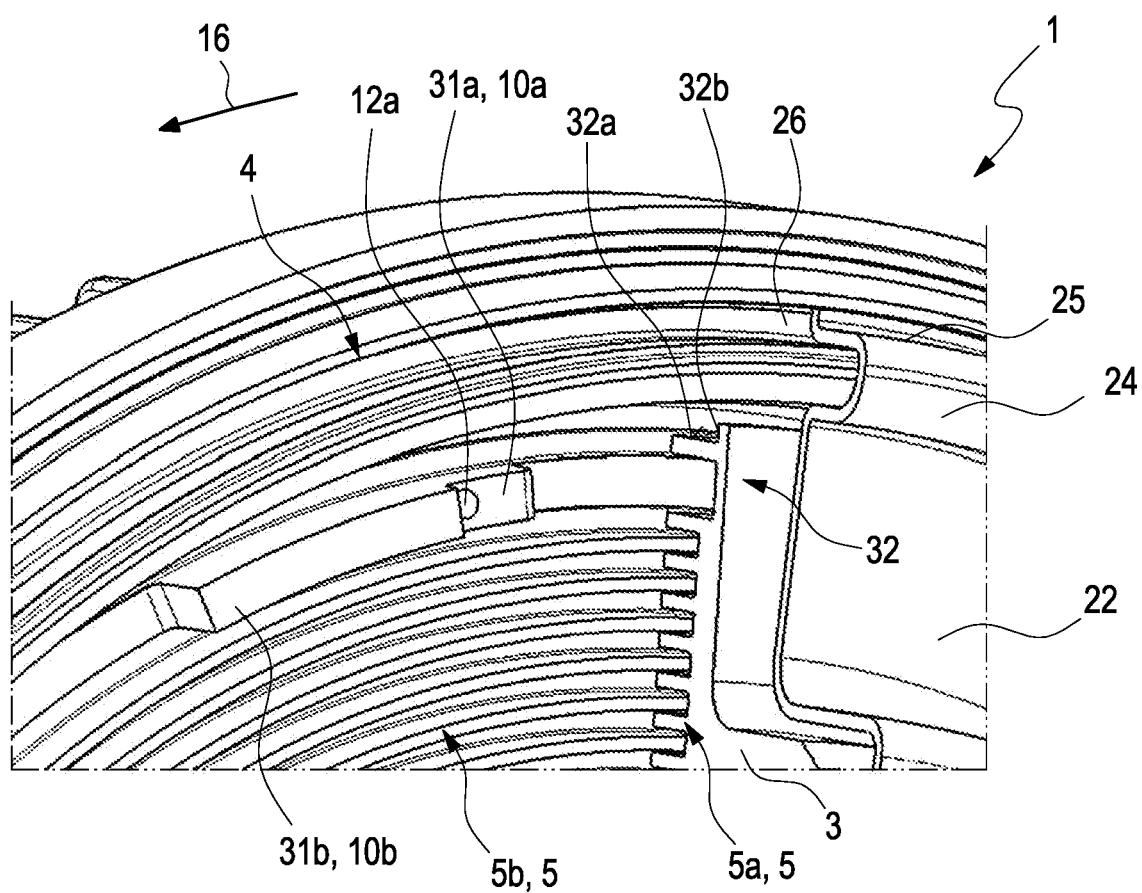
FIGS. 2 through 4 show views of the fluid friction clutch in the first embodiment.

FIG. 2 shows a view of the driven body 4 comprising the first retaining body 11a. The first retaining body 11a protrudes axially from the second groove profile 5b and engages axially and radially on both sides with a depression of the first groove profile 5a so as to form a seal. When the fluid friction clutch 1 is connected, the viscous fluid is retained at the first retaining body 11a and is conveyed into the return opening 12a under the effect of the generated retaining pressure. The return opening 12a is thereby displaced downstream from the retaining body 4 in the direction of rotation 16. The first retaining body 11a has two steps 31a and 31b with different axial height, wherein the smaller step 31a is displaced downstream from the higher step 31b in the direction of rotation 16. The return opening 12a thereby leads into the transfer region 5 at the smaller step 31. The transfer region 5 can be sealed better radially by means of the two steps 31 and 32b at the first retaining body 11a. A smaller throttling can further already be attained before the viscous fluid enters into the return opening 12a. The viscous fluid additionally enters into the return opening 12a in the region of the highest retaining pressure.

Figure 3:
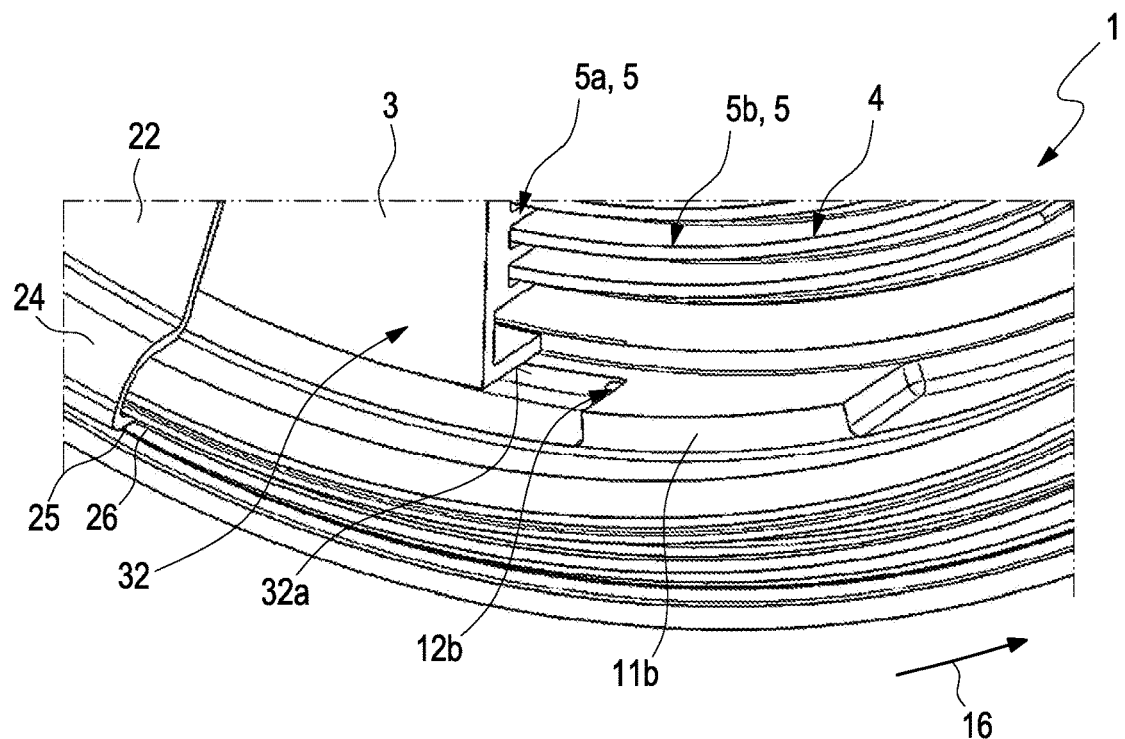
Figure 4:
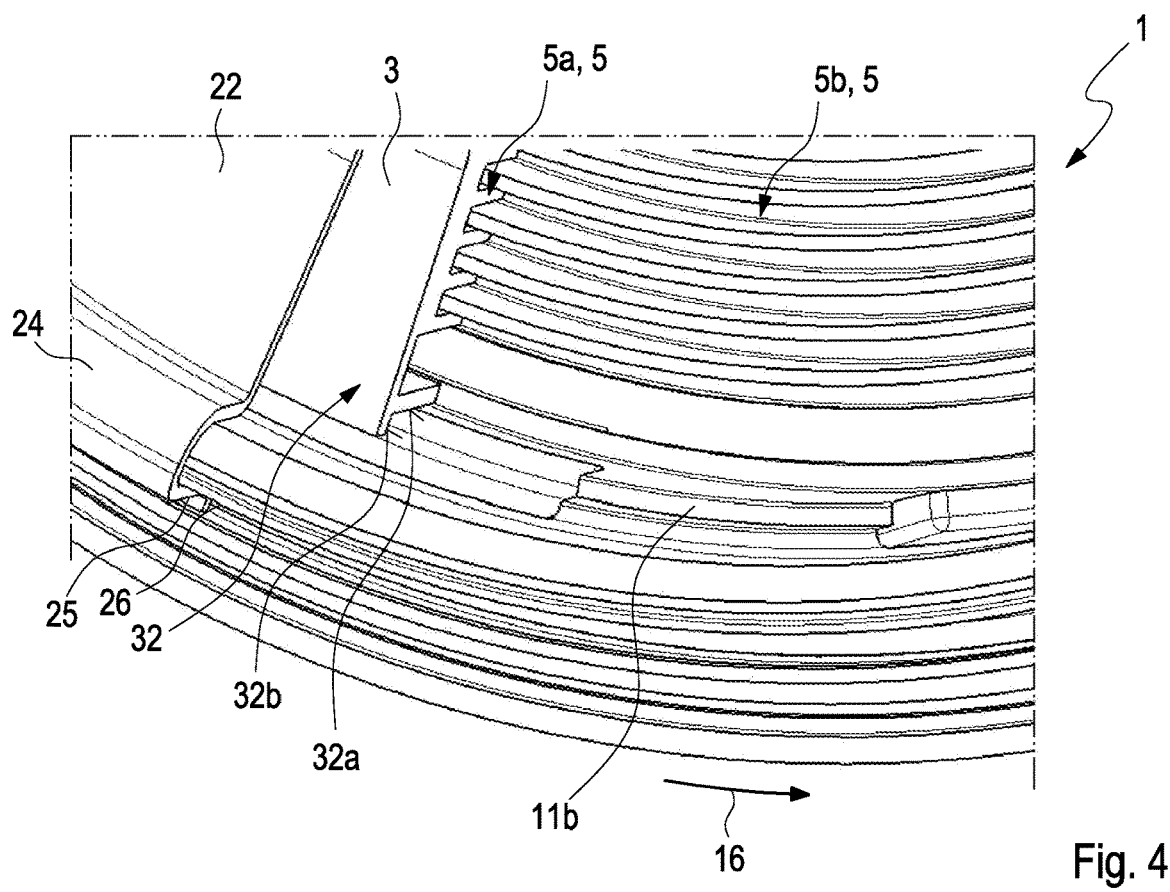

FIG. 3 and FIG. 4 show views of possible designs of the second retaining body 11b. In FIG. 3, the second retaining body 11b abuts radially on the first groove profile 5a of the drive disk 3 in an edge region 32 and wipes the excess viscous fluid off an axially oriented circumferential edge surface 32a of the first groove profile 5a. In FIG. 4, the second retaining body 11b abuts radially and axially on the first groove profile 5a of the drive disk 3 in the edge region 32. Here, the second retaining body 11b wipes the excess viscous fluid off the axially oriented circumferential edge surface 32a as well as off a radially oriented edge surface 32b of the first groove profile 5a. In FIG. 3, the excess fluid is removed from the second retaining body 11b via the return opening 12b. In FIG. 4, leakage path—not shown here—which guides the viscous fluid from the second retaining body 11b to the return opening 12a at the first retaining body 11a, can be formed for this purpose. The return opening 12b is not required in this case. The second retaining body 11b according to FIG. 4 is formed in FIG. 1, but is connected to the collecting groove 13 via the return opening 12b according to FIG. 3.

Due to the advantageous design of the two retaining bodies 11a and 11b, the viscous fluid can be conveyed quickly and almost completely out of the transfer region 5 into the storage chamber 6 when turning off the liquid friction clutch 1. On the one hand, the turn-off of the fluid friction clutch 1 can thus be accelerated and, on the other hand, the slip speed of the driven body 4 can be minimized as compared to conventional solutions. The two retaining bodies 11a and 11b are preferably rotated relative to one another by 180° and are thus uncoupled from one another. A return flow of the viscous fluid from the first retaining body 11a to the second retaining body 11b can in particular not take place.

Figure 5:
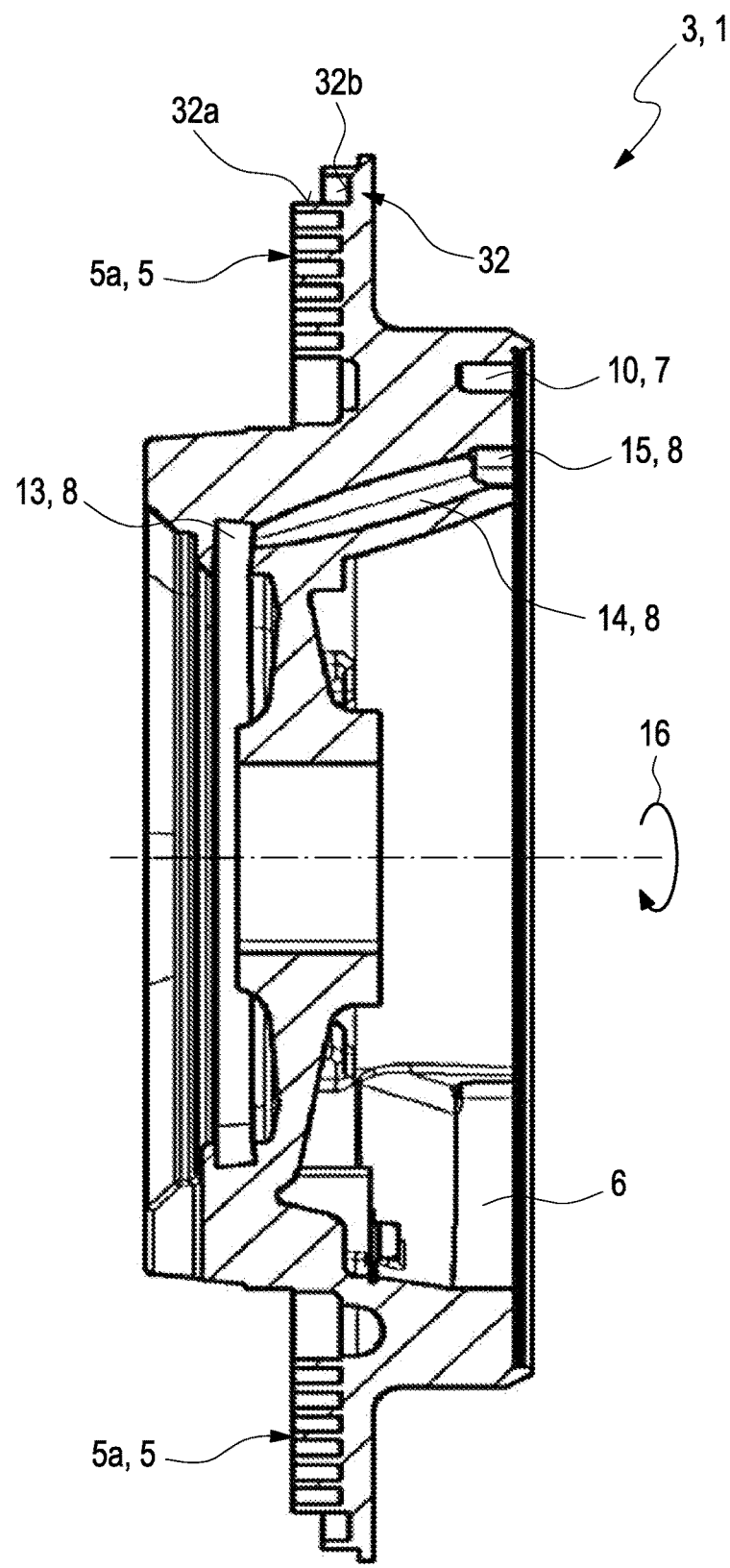
FIG. 5 shows a sectional view of a drive disk in the fluid friction clutch in the first embodiment.
Figure 6:
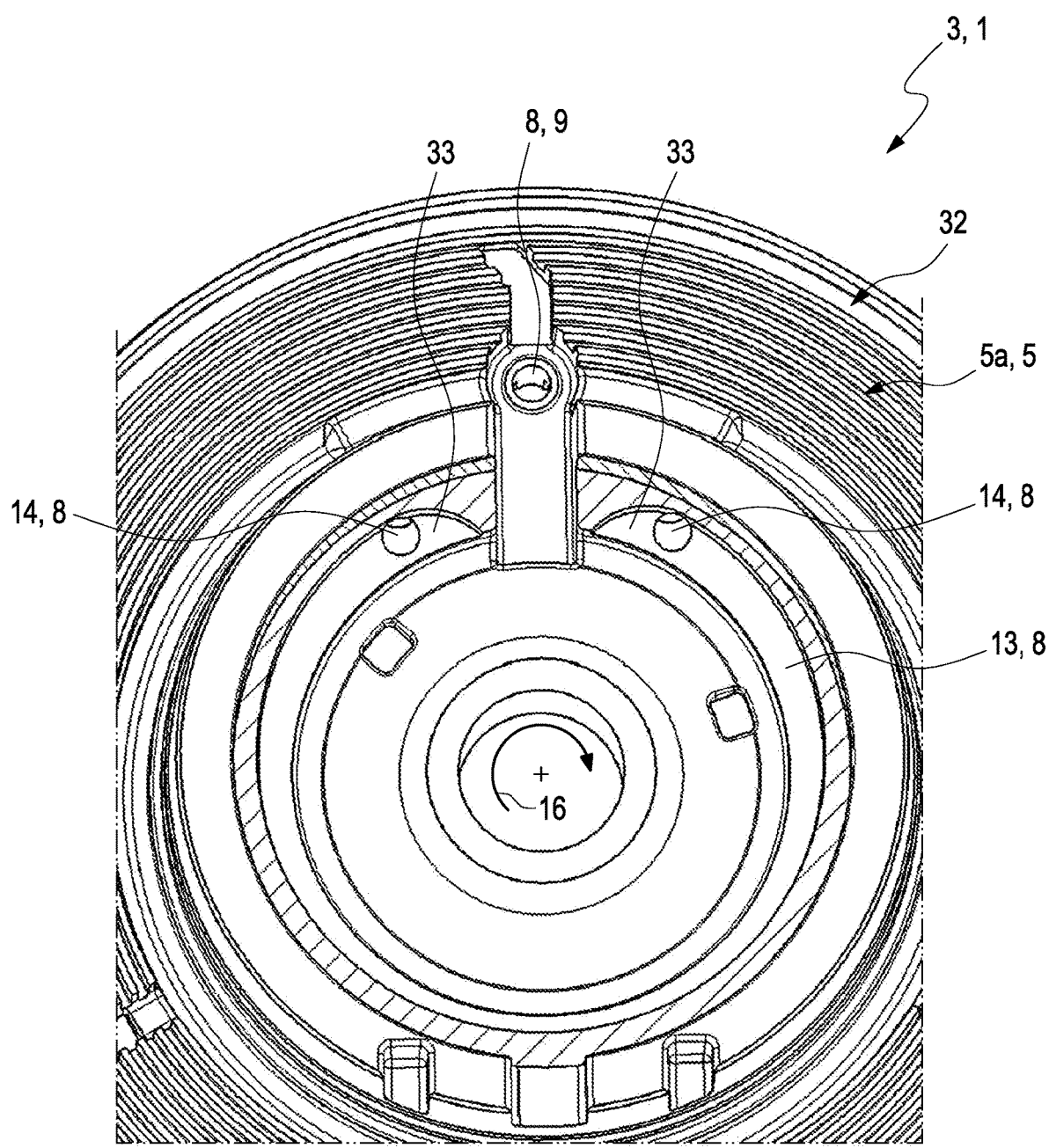
FIGS. 6 and 7 show a sectional view and a view of the drive disk in the fluid friction clutch in the first embodiment from opposite sides.

FIG. 5 shows a sectional view of the drive disk 3 in the fluid friction clutch 1. FIG. 6 shows a sectional view of the drive disk 3 from a side facing the driven body 4. As is also shown in FIG. 1, the viscous fluid in the return path 8 flows from the retaining bodies 11a and 11b via the return openings 12a and 12b to the collecting groove 13. As can be seen in FIG. 6, the collecting groove 13 is eccentric, so that the viscous fluid flows with a larger radius in regions 33 of the collecting groove 13 due to the acting centrifugal force. The two duct bores 14 lead into the collecting groove 13 in the regions 33. As can be seen in FIG. 5, the duct bores 14 are directed axially to the outside from a collecting groove 13. The centrifugal force thus acts on the viscous fluid in the duct bores 14 and the viscous fluid can be conveyed out of the collecting groove 13.

Figure 7:
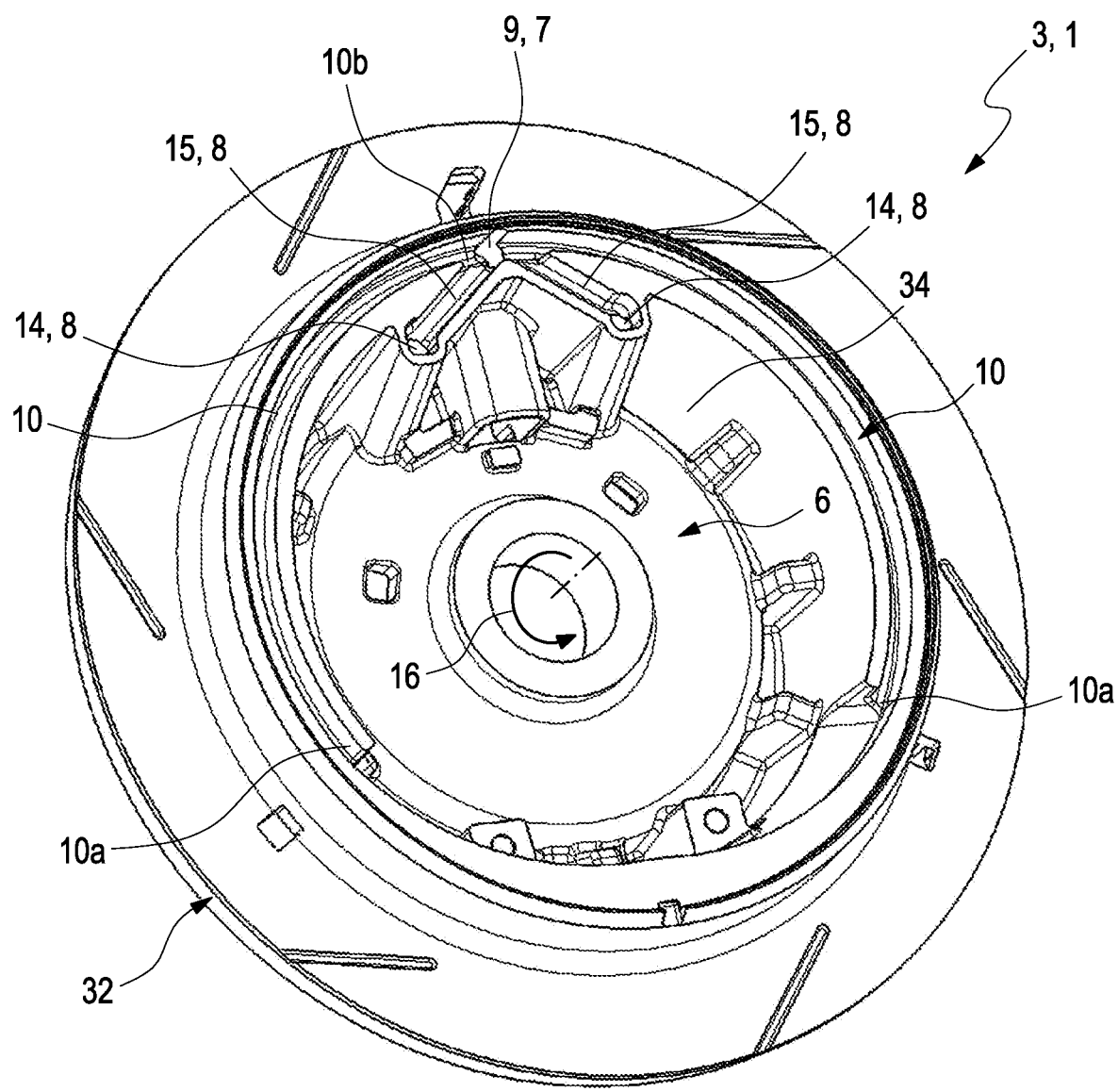

FIG. 7 now shows a view of the drive disk 3 from a side facing away from the driven body 4. It can be seen here that the two duct bores 14 are fluidically connected to the siphon ducts 10 on the inflow opening 9 via the short-circuit ducts 15 on the side of the drive disk 3 located opposite the collecting groove 13. The short-circuit ducts 15 are directed radially to the outside, so that the viscous fluid also flows to the inflow opening 9 here under the effect of the centrifugal force. The inflow opening 9 is thereby formed at outflows 10b of the two siphon ducts 10, which are offset radially to the outside relative to inflows 10a. The viscous fluid thus flows out of the storage chamber 6 at the inflows 10a into the siphon ducts 10 and is conveyed to the outflows 10b and to the inflow opening 9 under the effect of the centrifugal force. The viscous fluid can then reach into the transfer region 5 via the inflow opening 9.

To intensify the conveying of the fluid out of the storage chamber 6, the latter is formed eccentrically, so that the viscous fluid flows to the inflow opening 9 under the effect of the centrifugal force. Axial walls 34 of the storage chamber 6 are additionally inclined towards or away from the shaft 2. The storage chamber 6 further has an axial depth, which is higher as compared to conventional storage chambers, so that a sufficiently large amount of the viscous fluid can be retained in the non-driven fluid friction clutch 1 independently of the rotational angle position of the drive disk 3. As a whole, the fluid friction clutch 1 can thus be accessed more quickly because of a dead amount of the viscous fluid, which remains small. In contrast to many conventional solutions, the storage chamber 6 is designed circumferentially or without any radial dividing walls, so that an emptying of the storage chamber 6 is not prevented. The storage chamber 6 is vented completely to the inside by means of this design.

If the inflow opening 9 is releases by the magnetic valve 17—not shown here—the fluid can flow out of the return path 8 via the inflow opening 9 directly into the transfer region 5. When connecting the fluid friction clutch 1, the viscous fluid then flows out of the storage chamber 6 and out of the return path 8 into the transfer region 5, and the storage chamber 6 is emptied quickly and almost completely. The fluid friction clutch 1 can thus be connected quickly. The respective inflow 10a to the respective outflow 10b is further offset by more than 90° in or opposite to the direction of rotation 16. If the fluid friction clutch 1 is not driven, the viscous fluid can thus not flow unhindered into to transfer region 5 even in the case of an unfavorable rotational position of the drive disk 3. The unwanted connection of the fluid friction clutch 1 can thus already be prevented when starting the internal combustion engine.

FIG. 8 shows a sectional view of the drive disk 3 on the collecting groove 13. Here, the collecting groove 13 is molded in the drive disk 3. FIG. 9 and FIG. 10 show an alternative embodiment of the collecting groove 13 in the drive disk 3. Here, the collecting groove 13 is cast in the drive disk 3 and is partially limited to the driven body 4 by means of a cover disk 35.

Figure 11:
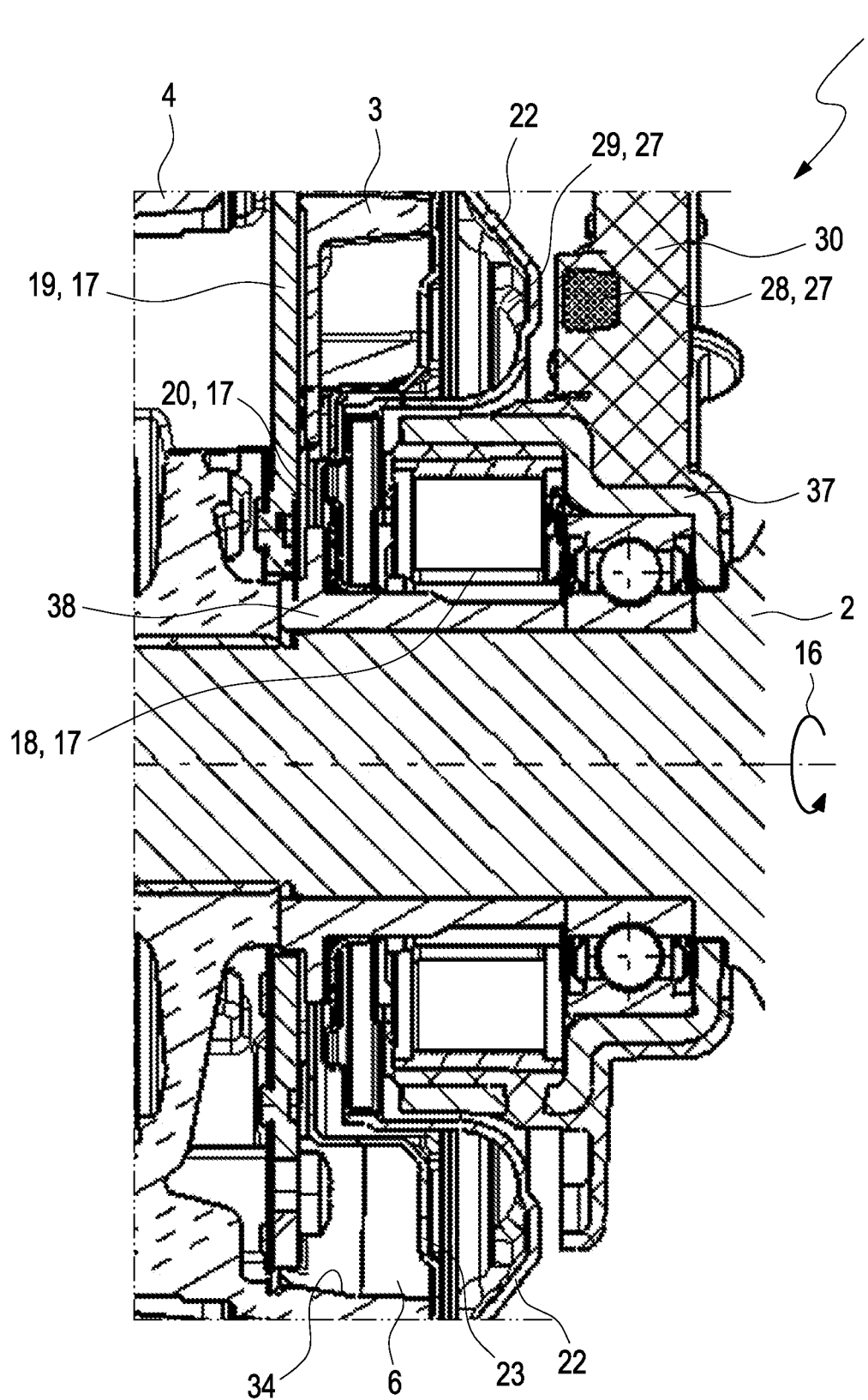
FIG. 11 shows a sectional view of the fluid friction clutch in the first embodiment on a magnetic valve.
Figure 12:
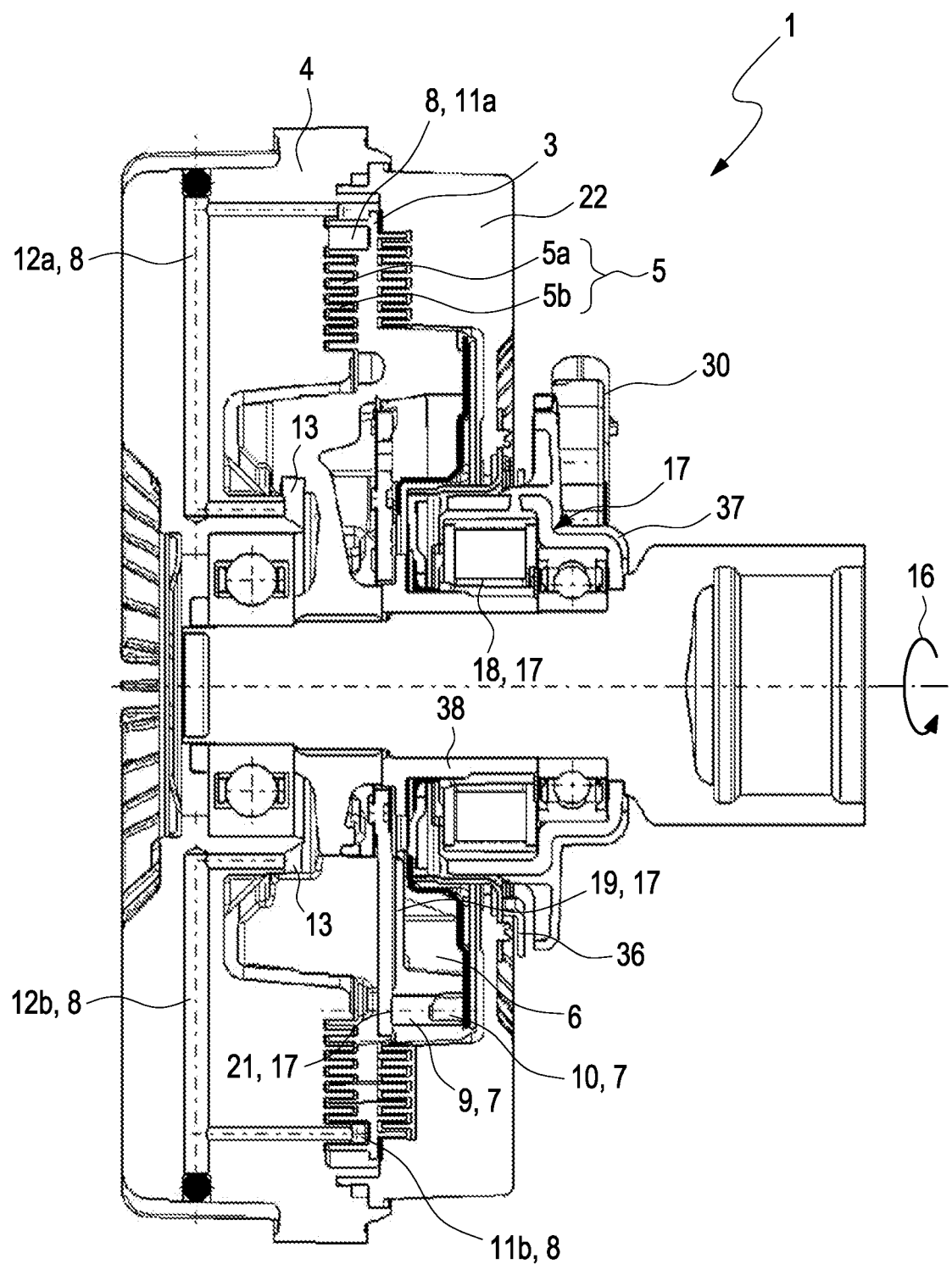
FIG. 12 shows a sectional view of the fluid friction clutch in the first embodiment comprising a cast cover.
Figure 14:
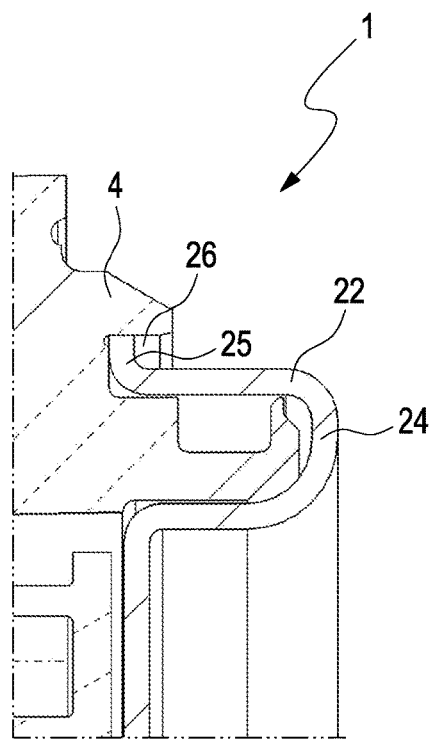
FIG. 14 shows a sectional view of the fluid friction clutch in the first embodiment on a cover.

FIG. 11 shows a sectional view of the fluid friction clutch 1 on the magnetic valve 17. The inflow path 7 is closed here. Here, the closing disk 23 and the cover 22 form an external pole of the electrical coil 18, so that the electrical coil 18 can be designed smaller due to the effective magnetic flux. FIG. 13 shows a view of the magnetic valve 17 at the inflow opening 9. When the inflow path 7 is closed, the position of the valve molding 21 is suggested by means of continuous lines, and when the inflow path 7 is open by means of broken lines. FIG. 12 shows a sectional view of the fluid friction clutch 1 comprising the cover 22, which is formed differently from FIG. 1 and FIG. 11. Here, the cover 22 is a cast part comprising a double profiling to increase the torque, and comprising several ribs to improve the heat dissipation. Here, the rotational speed counter 27 has the Hall sensor 28 and a tooth bezel 36, on which the rotational speed cam 29 is formed here. As intended, the tooth bezel 36 is made of a material, which can influence the magnetic field and thus the Hall sensor 28. FIG. 14 now shows a sectional view of the fluid friction clutch 1 on the cover 22, as it is shown in FIG.

1 and FIG. 11. The cover 22 is reinforced circumferentially by means of the reinforcing rib 24. The support region 25 is thereby arranged in the support depression 26 of the driven body 4 and engages radially and axially with the driven body 4 inside said support depression, so that the cover 22 is thus securely fastened to the driven body 4. Here, the cover 22 is made of steel and the driven body 4 is made of aluminum here. Aluminum has a higher heat expansion coefficient, so that the support region 25 remains clamped in the support depression 26 in response to the heating as well as in response to the cooling of the driven body 4 and of the cover 22.

Figure 15:
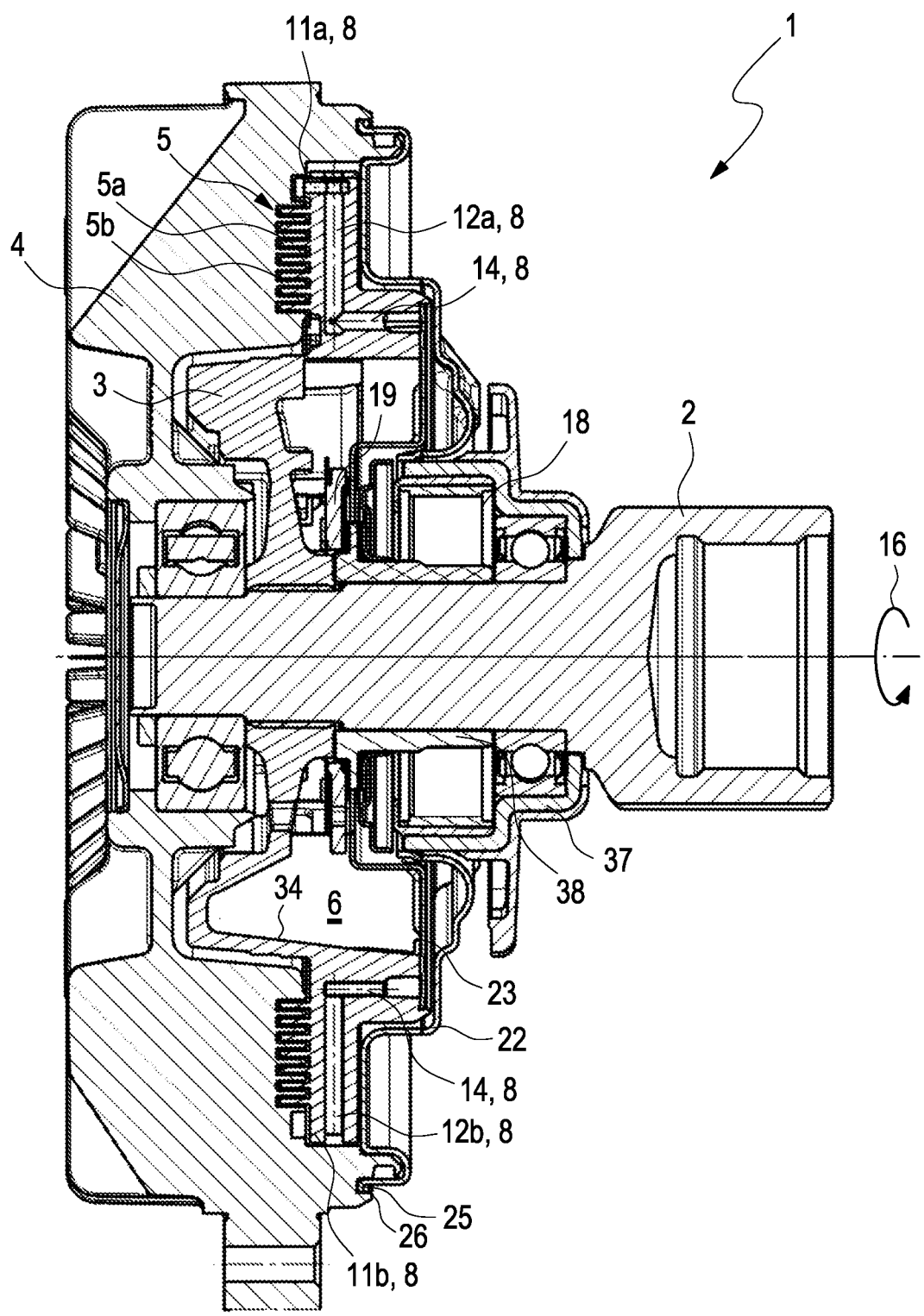
FIG. 15 shows a sectional view of a fluid friction clutch in a second embodiment.
Figure 16:
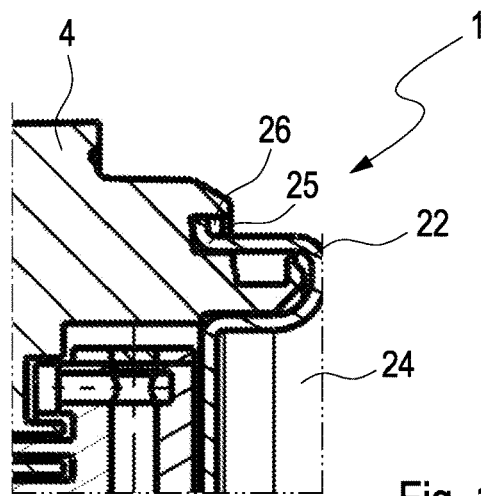
FIG. 16 shows an enlarged sectional view of the fluid friction clutch in the second embodiment.

FIG. 15 shows a sectional view of a fluid friction clutch 1 according to the invention in a second embodiment. In contrast to the first embodiment of the fluid friction clutch 1, the first retaining body 11a and the second retaining body 11b are formed here on the primary side thus on the drive disk 3. The retaining bodies 11a and 11b are thereby arranged offset to one another by 180° in the direction of rotation 16. In the alternative, the retaining bodies 11a and 11b can also be arranged closely next to one another. Deviating from the fluid friction clutch 1 in the first embodiment, no collecting groove is provided here in the return path 8, so that the two retaining bodies 11a and 11b are each fluidically connected to the siphon duct 10 via the return opening 12a and 12b, which leads into the respective duct bore 14. FIG. 16 shows an enlarged sectional view of the fluid friction clutch 1 from FIG. 15. Here, a section on the return opening 12a is shown, which is radially closed as intended.

Figure 17:
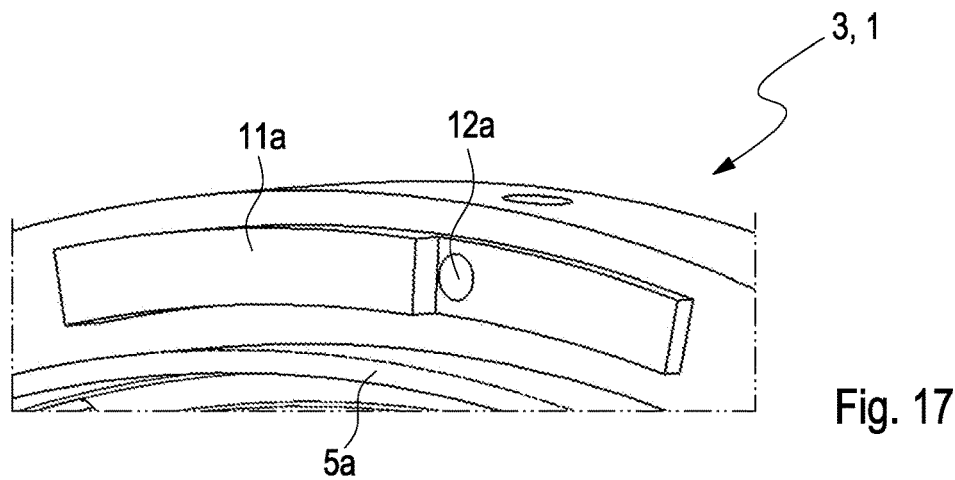
FIGS. 17 and 18 show views of the retaining bodies of the fluid friction clutch in the second embodiment.
Figure 18:
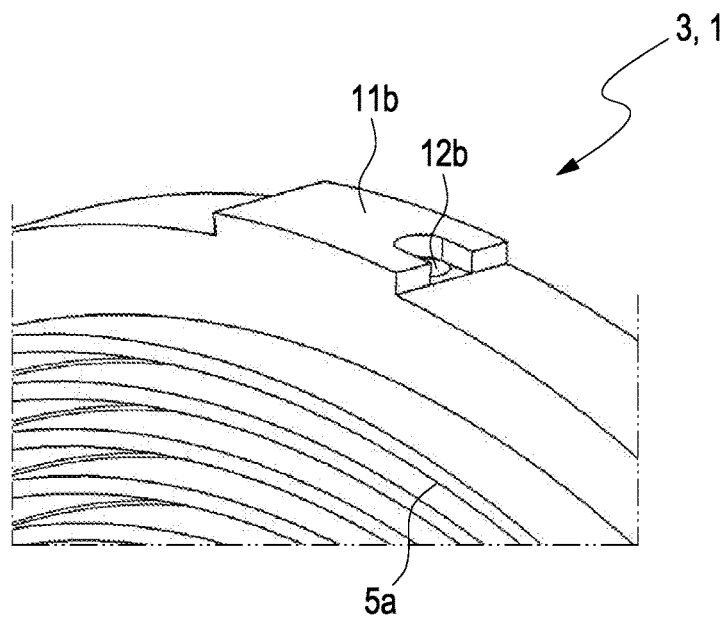

FIG. 17 shows a view of the first retaining body 11a, which is directed axially. FIG. 18 shows a view of the second retaining body 11b, which is directed radially. The two retaining bodies 11a and 11b are fluidically connected to the storage chamber 6 via the respective return openings 12a and 12b and the duct bores 14.

Figure 19:
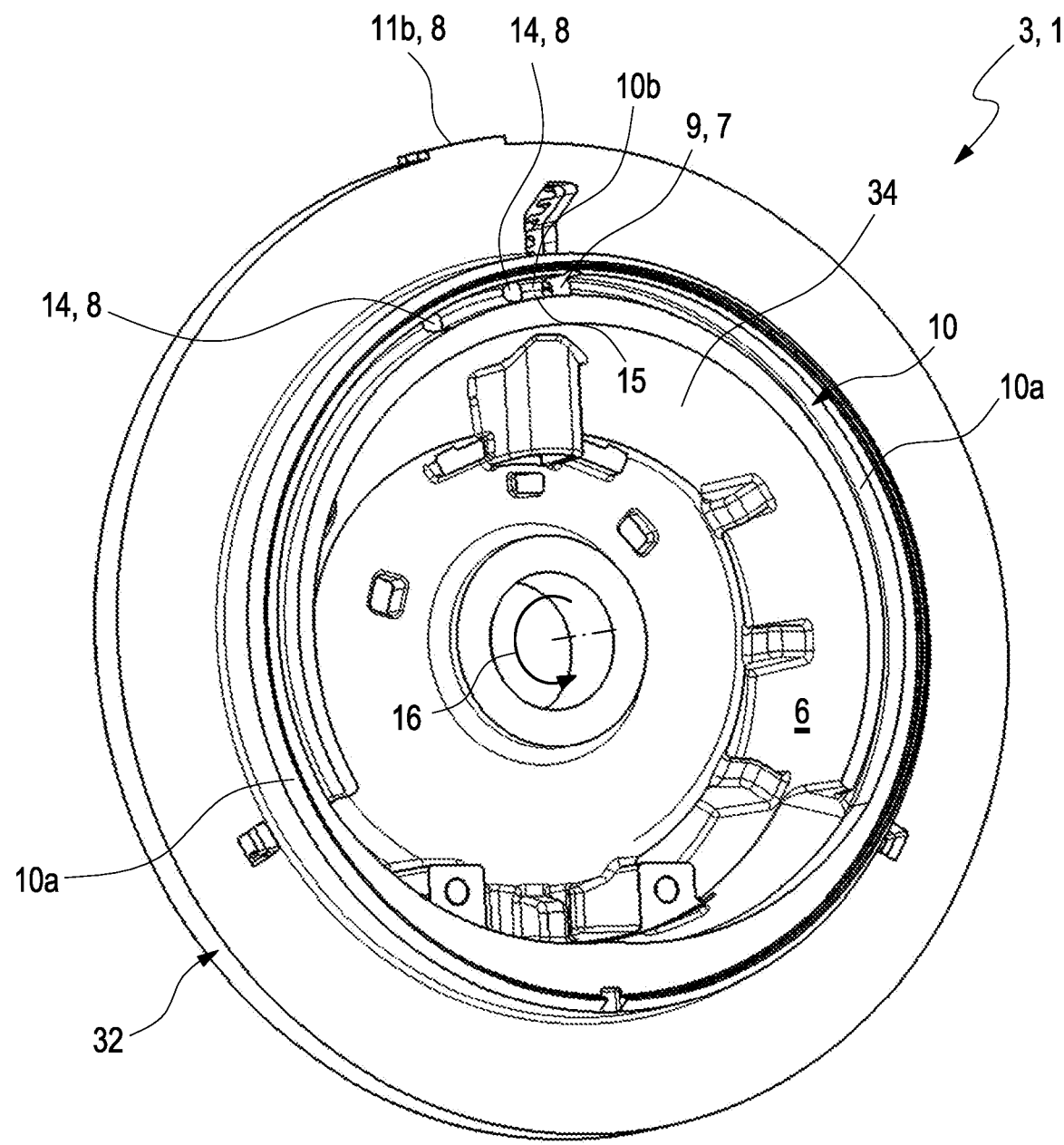
FIG. 19 shows a view of a drive disk of the fluid friction clutch in the second embodiment.

FIG. 19 shows a view of the drive disk 3 from a side facing away from the driven body 4. The inflow path 7 comprising the inflow opening 9 is visible here, via which the fluid can flow out of the storage chamber 6 to the transfer region 5. In this example, the two duct bores 14 lead into the siphon duct 10 adjacent to one another and are adjacent to one another in the outflow 10b of the siphon duct 10. The outflow 10b leads fluidically into the inflow opening 9 here. The drive disk 3 shown here has two retaining bodies 11a and 11b, which are arranged closely next to one another. This can be seen here in the two duct bores 14, which are located next to one another.

Figure 20:
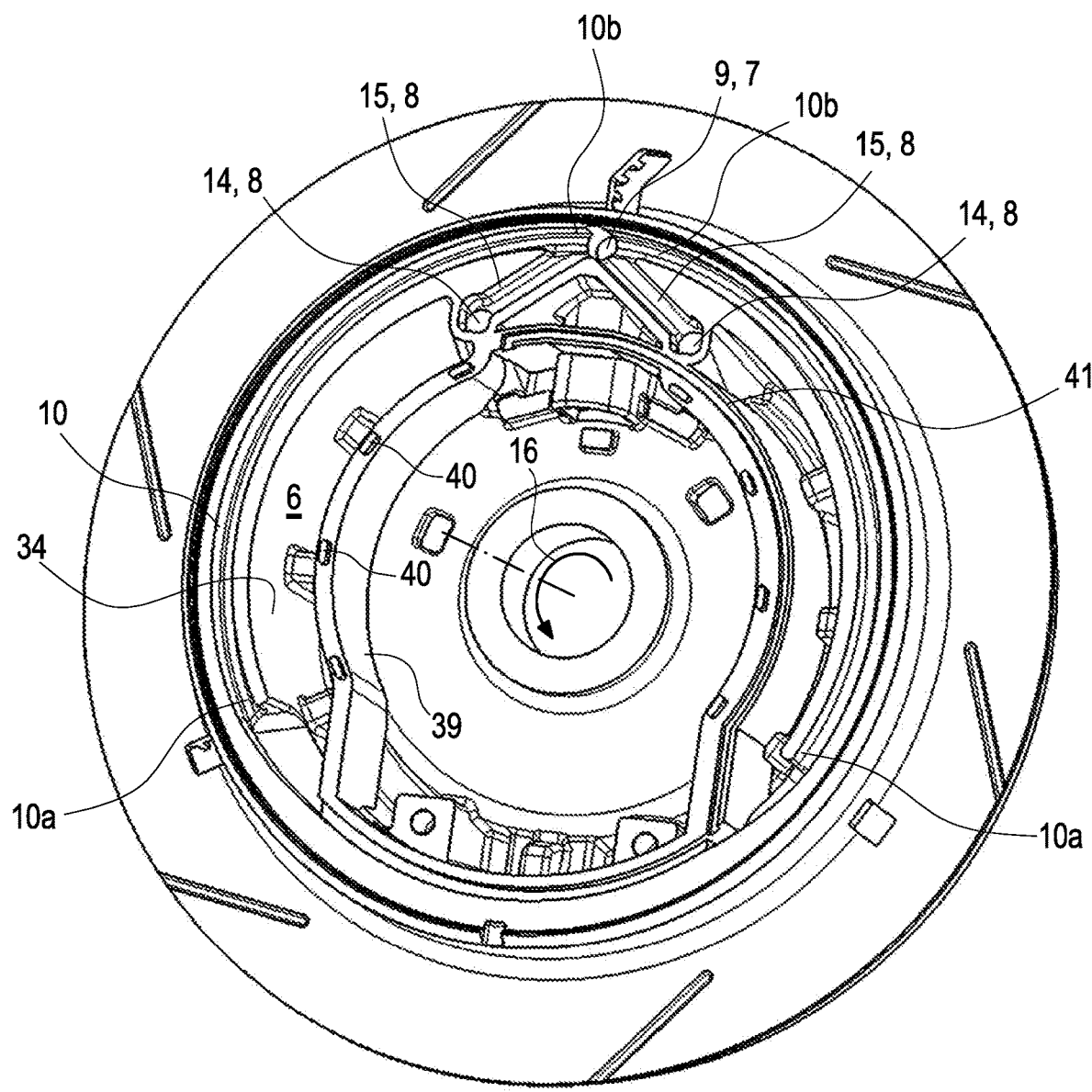
FIG. 20 shows a view of a drive disk of the fluid friction clutch in the first embodiment, which is designed differently from the drive disk in FIG. 7.
Figure 21:
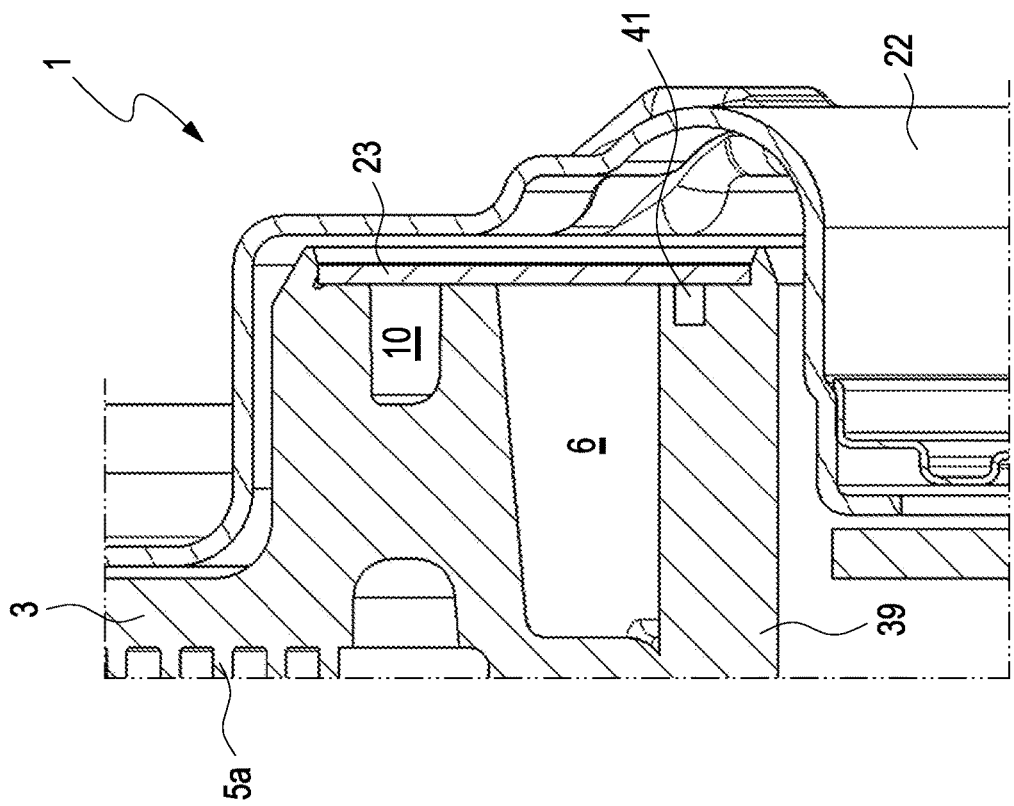
FIGS. 21 and 22 show sectional views of the drive disk comprising a closing disk of the fluid friction clutch, which is designed differently, in the first embodiment.

FIG. 20 shows a view of the drive disk 3 from a side facing away from the driven body 4. The drive disk 3 shown here for the fluid friction clutch 1 in the first embodiment is provided with secondary-side retaining bodies 11a and 11b. Deviating from the drive disk 3 in FIG. 7, the storage chamber 7 is closed to the inside here by means of a dividing wall 39. More fluid can thus be retained in the storage chamber 6, because the storage chamber 6 cannot overflow on the inner diameter. Several peening cams 40, to which the closing disk 23 is secured, are additionally formed on the dividing wall 39. The closing disk 23 can be deep-drawn, for example, and can be secured to the dividing wall 39 by pressing the peening cams 40. In the case of this alternative of the storage chamber 6, a vent duct 41 is additionally provided, by means of which a positive pressure is avoided in the storage chamber 6. Due to the fact that the positive pressure can prevent a quick inflow of the fluid into the storage chamber 6, the turn-off of the fluid friction clutch 1 can be accelerated by means of the vent duct 41. The vent duct 41 is ring segment-shaped and extends over an arc angle of larger than 90°, so that it remains open, independently of the rotational angle position of the drive disk 3. When the motor stands still, the viscous fluid can further not reach out of the storage chamber 6 into the transfer region 5 via the vent duct 41, which is designed here in such a way. It goes without saying that the drive disk 3 for the fluid friction clutch 1 in the second embodiment can also have the storage chamber 6 described here comprising the dividing wall 39 and the vent duct 41. FIG. 21 shows a sectional view of the drive disk 3 on the dividing wall 39.

Figure 22:
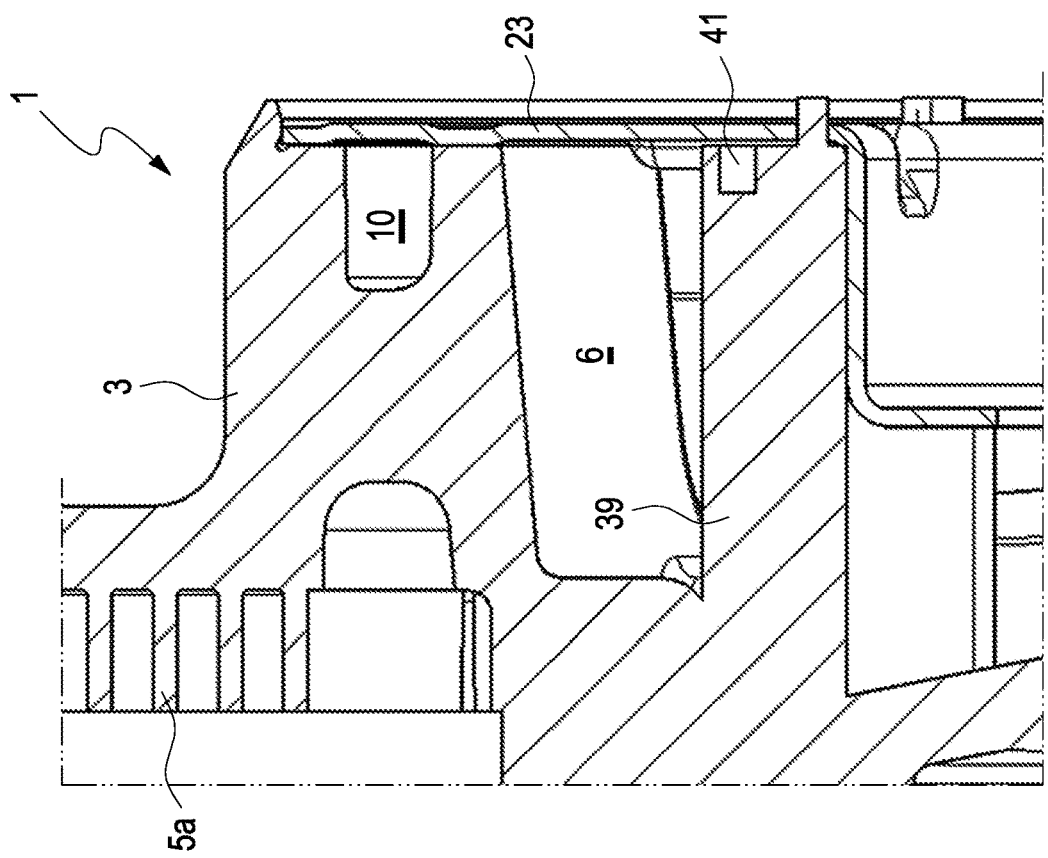

FIG. 22 shows a sectional view of the drive disk 3 comprising a differently designed closing disk 23. Here, the rive disk 3 is also provided for the fluid friction clutch 1 in the first embodiment. It goes without saying, however, that the shown design can also be transferred to the drive disk 3 for the fluid friction clutch 1 in the second embodiment. The closing disk 23 is flat and is crimped into the drive disk 3 on the outside as well as on the inside. The closing disk 23 thus has a simpler shape here than in FIG. 21, but has to be secured to the drive disk 3 in a more complex manner. The storage chamber 6 is vented by of the vent duct 41 in the same way as shown in FIG. 20 and in FIG. 21 here. Different embodiments are generally conceivable for the storage chamber 6 comprising the closing disk 23—as shown for example in FIG. 21 and FIG. 22. The storage chamber 6 can thus be open to the inside, and the closing disk 23 can be crimped only on the outside. In the alternative, the storage chamber 6 can be closed to the inside, and the closing disk 23 can be peened by means of the peening cam 40 and can be crimped on the outside. In the alternative, the storage chamber 6 can be closed to the inside, and the closing disk 23 can be pressed in on an inner diameter of the dividing wall 39, and can be crimped on the outside. In the alternative, the storage chamber 6 can be closed to the inside, and the planar closing disk 23 can be crimpled on the inside and on the outside.

LIST OF REFERENCE NUMERALS 1. fluid friction clutch
2. shaft
3. drive disk
4. drive body/motor vehicle fan
5. transfer region
5a. first groove profile
5b. second groove profile
6. storage chamber
7. inflow path
8. return path
9. inflow opening
10. siphon duct
10a. inflow of the siphon duct
10b. outflow of the siphon duct
11a. first retaining body
11b. second retaining body
12a. return opening on the first retaining body
12b. return opening on the second retaining body
13. collecting groove
14. duct bore
15. short-circuit duct
16. direction of rotation
17. magnetic valve
18. electrical coil
19. armature disk
20. return spring
21. valve molding 22. cover
23. closing disk
24. reinforcing rib
25. support region
26. support depression of the driven body
27. rotational speed counter
28. Hall sensor
29. rotational speed cam
30. housing section
31a. smaller step of the first retaining body
31b. larger step of the first retaining body
32. edge region of the first groove profile
32a. axial edge surface
32b. radial edge surface
33. region of the collecting groove
34. axial wall of the storage chamber
35. cover disk
36. tooth bezel
37. coil cup
38. inner sleeve
39. dividing wall
40. peening cam
41. vent duct

The invention claimed is:

1. A fluid friction clutch, comprising:
a rotatably mounted shaft;
a drive disk arranged on the shaft in a rotationally fixed manner;
a driven body rotatably arranged on the shaft;
a radially extending ring-shaped transfer region disposed between the drive disk and the driven body, the transfer region configured to receive a viscous fluid via which the drive disk is couplable to the driven body for transferring a torque;
the transfer region, at least in some regions, defined by a radially extending ring-shaped first groove profile of the drive disk and a radially extending ring-shaped second groove profile of the driven body that engage one another axially;
a ring segment-shaped storage chamber configured to receive the viscous fluid, the storage chamber fluidically connected to the transfer region via an inflow path and via a return path;
the return path including a first retaining body and a second retaining body, the first retaining body and the second retaining body arranged on one of the first groove profile and the second groove profile offset radially relative to one another by an arc angle extending in a direction of rotation of the drive disk; and
wherein the arc angle deviates from zero.

2. The fluid friction clutch according to claim 1, wherein:
the first retaining body protrudes axially from the one of the first groove profile and the second groove profile;
the first retaining body engages axially and radially on both sides with a depression of the other of the one of the first groove profile and the second groove profile forming a seal such that an excess of the viscous fluid is retainable at the first retaining body between the first groove profile and the second groove profile; and
the first retaining body is arranged in the return path downstream of a return opening that leads to the storage chamber such that the excess viscous fluid retained upstream of the first retaining body is conveyable to the storage chamber via the return opening.

3. The fluid friction clutch according to claim 2, wherein:
the second retaining body is offset radially to an outside from the first retaining body and abuts on an edge region of the other of the one of the first groove profile and the second groove profile forming a radial seal and optionally an axial seal such that an excess of the viscous fluid is wipeable radially off and optionally axially off the other of the one of the first groove profile and the second groove profile and is retainable at the second retaining body; and
the second retaining body is fluidically connected to the return opening via a leakage path of the one of the first groove profile and the second groove profile such that the excess viscous fluid retained upstream of the second retaining body is conveyable via the leakage path to the first retaining body and further via the return opening to the storage chamber.

4. The fluid friction clutch according to claim 2, wherein:
the first retaining body includes a plurality of steps each having a different axial height;
the plurality of steps are arranged such that a respective axial height of each of the plurality of steps increases in the direction of rotation; and
the return opening leads into the transfer region at a step of the plurality of steps having the smallest axial height.

5. The fluid friction clutch according to claim 2, wherein:
the second retaining body is offset radially to an outside from the first retaining body and abuts on an edge region of the other of the one of the first groove profile and the second groove profile forming a radial seal and optionally an axial seal such that an excess of the viscous fluid is wipeable radially off and optionally axially off the other of the one of the first groove profile and the second groove profile and is retainable at the second retaining body; and
the second retaining body is arranged in the return path downstream of a further return opening such that an excess viscous fluid retained upstream of the second retaining body is conveyable to the storage chamber via the further return opening.

6. The fluid friction clutch according to claim 1, wherein the second retaining body is offset radially to an outside from the first retaining body and abuts on an edge region of the other of the one of the first groove profile and the second groove profile forming a radial seal and optionally an axial seal such that an excess of the viscous fluid is wipeable radially off and optionally axially off the other of the one of the first groove profile and the second groove profile and is retainable at the second retaining body.

7. The fluid friction clutch according to claim 1, wherein the first retaining body includes a normal pressure region and a positive pressure region, and wherein one of:
the second retaining body is arranged in the normal pressure region of the first retaining body;
the second retaining body is arranged in the positive pressure region of the first retaining body; and
the second retaining body is arranged in a transition region between the normal pressure region and the positive pressure region of the first retaining body.

8. The fluid friction clutch according to claim 1, wherein:
the return path has further includes at least one return opening and at least one axial duct bore, the at least one return opening extending radially to an inside at least in some regions;
the at least one return opening extends into the transfer region at one end and is fluidically connected to the at least one duct bore at another end, and
the at least one duct bore extends to the storage chamber such that an excess of the viscous fluid retained at at least one of the first retaining body and the second retaining body is conveyable through the at least one return opening via a retaining pressure at the at least one of the first retaining body and the second retaining body, and through the at least one duct bore to the storage chamber.

9. The fluid friction clutch according to claim 1, wherein:
the inflow path includes an axial inflow opening and at least one circumferential ring segment-shaped siphon duct;
the at least one siphon duct fluidically connects the storage chamber to the inflow opening; and
the inflow opening extends into the at least one siphon duct at one end and into the transfer region at another end such that the viscous fluid is conveyable from the storage chamber through the at least one siphon duct to the inflow opening via a centrifugal force, and through the inflow opening into the transfer region via the centrifugal force.

10. The fluid friction clutch according to claim 9, wherein:
the return path further includes at least one return opening and at least one axial duct bore, the at least one return opening extending radially to an inside at least in some regions;
the at least one return opening extends into the transfer region at one end and is fluidically connected to the at least one duct bore at another end;
the at least one duct bore extends to the storage chamber such that an excess of the viscous fluid retained at at least one of the first retaining body and the second retaining body is conveyable through the at least one return opening via a retaining pressure at the at least one of the first retaining body and the second retaining body, and through the at least one duct bore to the storage chamber; and
the at least one duct bore is fluidically connected to the at least one siphon duct adjacent to the inflow opening via a short-circuit duct directed to an outside such that the viscous fluid is flowable out of the at least one duct bore via the short-circuit duct and directly into the inflow opening bypassing the storage chamber.

11. The fluid friction clutch according to claim 10, wherein:
the at least one siphon duct has an inflow fluidically connected to the storage chamber, and an outflow fluidically connected to the inflow opening;
the outflow is offset radially to an outside relative to the inflow such that the viscous fluid is conveyable out of the storage chamber through the at least one siphon duct to the inflow opening via the centrifugal force; and
the outflow is offset to the inflow by more than 90° in one of (i) the direction of rotation and (ii) a direction opposite the direction of rotation.

12. The fluid friction clutch according to claim 11, wherein at least one of:
the storage chamber is eccentric; and
at least one axial wall of the storage chamber extends axially to the outside obliquely relative to the shaft at least in some regions such that the viscous fluid is conveyable to the inflow via the centrifugal force.

13. The fluid friction clutch according to claim 12, wherein the at least one duct bore extends axially to the outside such that the viscous fluid is conveyable through the at least one duct bore to the storage chamber via the centrifugal force.

14. The fluid friction clutch according to claim 9, wherein:
the return path further includes at least one return opening and at least one axial duct bore, the at least one return opening extending radially to an inside at least in some regions;
the at least one return opening extends into the transfer region at one end and is fluidically connected to the at least one duct bore at another end;
the at least one duct bore extends to the storage chamber such that an excess of the viscous fluid retained at at least one of the first retaining body and the second retaining body is conveyable through the at least one return opening via a retaining pressure at the at least one of the first retaining body and the second retaining body, and through the at least one duct bore to the storage chamber;
the first retaining body, the second retaining body, and the at least one return opening are formed in the driven body;
the storage chamber, the at least one duct bore, the inflow opening, and the at least one siphon duct are formed in the drive disk; and
the at least one return opening is fluidically connected to the at least one duct bore via a circumferential eccentric collecting groove formed in the drive disk.

15. The fluid friction clutch according to claim 9, wherein:
the return path further includes at least one return opening and at least one axial duct bore, the at least one return opening extending radially to an inside at least in some regions;
the at least one return opening extends into the transfer region at one end and is fluidically connected to the at least one duct bore at another end;
the at least one duct bore extends to the storage chamber such that an excess of the viscous fluid retained at at least one of the first retaining body and the second retaining body is conveyable through the at least one return opening via a retaining pressure at the at least one of the first retaining body and the second retaining body, and through the at least one duct bore to the storage chamber;
the first retaining body, the second retaining body, the at least one return opening, the storage chamber, the at least one duct bore, the inflow opening, and the at least one siphon duct are formed in the drive disk; and
the at least one return opening is fluidically connected directly to the at least one duct bore.

16. The fluid friction clutch according to claim 1, further comprising a magnetic valve structured and arranged to open and close the inflow path, the magnetic valve including:
an electrical coil revolving around the shaft;
a ferromagnetic armature disk revolving around the shaft, the armature disk including a valve molding; and
a return spring;
wherein the armature disk is at least one of axially moveable and pivotable via a magnetic force of the electrical coil;
wherein, when the electrical coil is connected, the armature disk is at least one of axially moved and pivoted via the magnetic force against a spring force of the return spring such that the valve molding abuts and closes the inflow path; and
wherein, when the electrical coil is turned off, the armature disk is at least one of axially moved and pivoted via the spring force such that the valve molding releases the inflow path.

17. The fluid friction clutch according to claim 1, further comprising a magnetic valve structured and arranged to open and close the inflow path, the magnetic valve including:
- an electrical coil revolving around the shaft;
- a ferromagnetic armature disk revolving around the shaft, the armature disk including a valve molding; and
- a return spring;
- wherein the armature disk is at least one of axially moveable and pivotable via a magnetic force of the electrical coil;
- wherein, when the electrical coil is turned off, the armature disk is at least one of axially moved and pivoted via a spring force of the return spring such that the valve molding abuts and closes the inflow path; and
- wherein, when the electrical coil is connected the armature disk is at least one of axially moved and pivoted via the magnetic force against the spring force such that the valve molding releases the inflow path.

18. The fluid friction clutch according to claim 1, further comprising a cover and a closing disk, wherein:
- the closing disk is arranged axially on the drive disk and is secured thereto such that the closing disk and the drive disk are tight radially to an outside; and
- the cover is arranged axially on the closing disk and is secured to the driven body such that the closing disk and the drive disk are arranged axially between the driven body and the cover.

19. The fluid friction clutch according to claim 18, wherein one of:
- the cover is structured as a sheet metal cover having a circumferential reinforcing rib disposed radially on the outside and a support region connected to the reinforcing rib radially on the outside, the sheet metal cover coupled to the driven body in a rotationally fixed manner, the support region disposed in a support depression of the driven body and engaging radially and axially with the driven body within the support depression; and
- the cover is structured as a cast cover and is secured to the driven body in a rotationally fixed manner.

20. The fluid friction clutch according to claim 18, further comprising a rotational speed counter including a Hall sensor and a rotational speed cam, wherein:
- the Hall sensor includes at least one of an integrated permanent magnet and a separate permanent magnet, the Hall sensor arranged in a housing section of the fluid friction clutch; and
- the rotational speed cam is at least one of secured to the cover, integrally disposed on the cover, and disposed on a tooth bezel secured to the cover.

* * * * *